United States Patent
Zhao et al.

(10) Patent No.: US 12,487,735 B2
(45) Date of Patent: Dec. 2, 2025

(54) METHOD AND APPARATUS FOR ADJUSTING INTERFACE LAYOUT, DEVICE, AND STORAGE MEDIUM

(71) Applicant: TENCENT TECHNOLOGY (SHENZHEN) COMPANY LIMITED, Shenzhen (CN)

(72) Inventors: Pengcheng Zhao, Shenzhen (CN); Honglong Zhang, Shenzhen (CN); Shaobo Jiang, Shenzhen (CN); Junlin Cai, Shenzhen (CN); Ge Li, Shenzhen (CN); Lei Zhu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 235 days.

(21) Appl. No.: 18/487,075

(22) Filed: Oct. 14, 2023

(65) Prior Publication Data
US 2024/0036718 A1    Feb. 1, 2024

Related U.S. Application Data

(63) Continuation of application No. PCT/CN2022/136168, filed on Dec. 2, 2022.

(30) Foreign Application Priority Data

Mar. 4, 2022 (CN) .......................... 202210207998.7

(51) Int. Cl.
*G06F 3/048* (2013.01)
*G06F 3/0482* (2013.01)
*G06F 3/04845* (2022.01)

(52) U.S. Cl.
CPC ........ *G06F 3/04845* (2013.01); *G06F 3/0482* (2013.01)

(58) Field of Classification Search
CPC .. G06F 3/0481; G06F 3/04845; G06F 3/0482; G06F 9/451
See application file for complete search history.

(56) References Cited

U.S. PATENT DOCUMENTS 5,796,401 A * 8/1998 Winer .................... G06T 11/60
                                                           345/619
9,626,146 B2 * 4/2017 Song .................... G06F 3/1454
(Continued)

FOREIGN PATENT DOCUMENTS

CN      103473044 A    12/2013
CN      103823620 A     5/2014
(Continued)

OTHER PUBLICATIONS

The European Patent Office (EPO) The Extended European Search Report for Application No. 22929624 Apr. 9, 22, 2025 9 Pages.
(Continued)

*Primary Examiner* — Linh K Pham
(74) *Attorney, Agent, or Firm* — ANOVA LAW GROUP PLLC

(57) ABSTRACT

A method and an apparatus for adjusting an interface layout, and a device, and a storage medium are provided in embodiments of this application. The method includes acquiring a trigger operation for an application to be displayed; and displaying an adapted application interface of the application on the screen in response to the trigger operation, the adapted application interface comprising a plurality of interface elements, and for an interface element interface elements, a first physical size of the interface element presented in the adapted application interface being the same as a second physical size presented in a reference application interface; and the first physical size of the interface element being determined based on an adapted virtual pixel size of the interface element and a dot density, and the adapted
(Continued)

virtual pixel size being the same as a reference virtual pixel size of the interface element in the reference application interface.

19 Claims, 14 Drawing Sheets

(56) References Cited

U.S. PATENT DOCUMENTS

| | | | |
|---|---|---|---|
| 10,089,963 B2 | 10/2018 | Lu et al. | |
| 2007/0266335 A1 | 11/2007 | Zielinski et al. | |
| 2009/0300538 A1* | 12/2009 | Okamura | G09G 5/14 |
| | | | 715/779 |
| 2013/0063492 A1* | 3/2013 | Washington | G09G 5/003 |
| | | | 345/660 |
| 2016/0246561 A1 | 8/2016 | Lünnemann et al. | |
| 2017/0069297 A1 | 3/2017 | Lu et al. | |
| 2017/0078504 A1* | 3/2017 | Nagata | G09G 5/14 |
| 2018/0033406 A1* | 2/2018 | Park | G09G 3/2074 |
| 2018/0046368 A1* | 2/2018 | Cheng | G06F 3/14 |
| 2019/0302998 A1* | 10/2019 | Kawahara | G06F 3/04847 |
| 2020/0251074 A1* | 8/2020 | Suryanarayana | G06F 3/04845 |
| 2022/0137796 A1 | 5/2022 | Wang | |
| 2023/0315269 A1* | 10/2023 | He | G06F 9/44 |
| | | | 715/781 |
| 2024/0020074 A1* | 1/2024 | Chen | H04N 21/8173 |

FOREIGN PATENT DOCUMENTS

| | | |
|---|---|---|
| CN | 102662563 B | 3/2015 |
| CN | 107273000 A | 10/2017 |
| CN | 108363604 A | 8/2018 |
| CN | 108415754 A | 8/2018 |
| CN | 109542550 A | 3/2019 |
| CN | 109783181 A | 5/2019 |
| CN | 110007919 A | 7/2019 |
| CN | 111443974 A | 7/2020 |
| CN | 114115619 A | 3/2022 |
| CN | 114115769 A | 3/2022 |
| CN | 114610426 A | 6/2022 |

OTHER PUBLICATIONS

China National Intellectual Property Administration (CNIPA) Office Action 1 for 202210207998.7 Jun. 8, 2023 13 Pages (including translation).

The World Intellectual Property Organization (WIPO) International Search Report for PCT/CN2022/136168 Feb. 10, 2023 11 Pages (including translation).

Support different pixel densities, Developers, https://developer.android.com/training/multiscreen/screendensities.

* cited by examiner

METHOD AND APPARATUS FOR ADJUSTING INTERFACE LAYOUT, DEVICE, AND STORAGE MEDIUM

RELATED APPLICATIONS

This application is a continuation of PCT Application No. PCT/CN2022/136168 filed on Dec. 2, 2022, which in turn claims priority to Chinese Patent Application No. 202210207998.7, entitled "METHOD AND APPARATUS FOR ADJUSTING INTERFACE LAYOUT, DEVICE, AND STORAGE MEDIUM" filed in China National Intellectual Property Administration, Mar. 4, 2022. The two references are incorporated herein by reference in their entirety.

FIELD OF THE TECHNOLOGY

Embodiments of this application relate to the field of front-end technology, and in particular, to a method and an apparatus for adjusting an interface layout, and a device, and a storage medium.

BACKGROUND OF THE DISCLOSURE

Various applications can be installed on the terminal devices. The interface layout of an application greatly affects user experience of an object on the application.

In related art, a reference application interface of an application generally corresponds to a reference resolution of a reference screen, for example, 1280 px*720 px, and resolutions to be adapted corresponding to screens to be adapted of different terminal devices may be different. Therefore, in order to adapt to the different terminal devices, in related art, physical sizes of interface elements presented in the reference application interface are adjusted correspondingly based on proportional relationships between the reference resolution and respective resolutions to be adapted, to obtain adapted application interfaces displayed on the different terminal devices.

Because resolutions to be adapted corresponding to the different terminal devices are different, proportional relationships between the different resolutions to be adapted and the reference resolution are also different. Therefore, the adapted application interfaces obtained by adjusting the physical sizes of the interface elements in the same reference application interface using the different proportional relationships are also different, that is, the physical sizes of the interface elements in the adapted application interfaces presented on the different terminal devices are different, which further affects visual presentation effect of the application interface.

SUMMARY

A method and an apparatus for adjusting an interface layout, and a device, and a storage medium are provided in embodiments of this application, for improving visual presentation effect of an application interface.

One aspect of this application provides a method for adjusting an interface layout, which is performed by a computer device and includes: receiving a trigger operation for an application to be displayed on a screen; and displaying an adapted application interface of the application on the screen in response to the trigger operation, the adapted application interface comprising a plurality of interface elements, and for an interface element of the plurality of interface elements, a first physical size of the interface element presented in the adapted application interface being the same as a second physical size presented in a reference application interface; and the first physical size of the interface element being determined based on an adapted virtual pixel size of the interface element in the adapted application interface and a dot density to be adapted, and the adapted virtual pixel size being the same as a reference virtual pixel size of the interface element in the reference application interface.

Another aspect of this application provides a computer device in an embodiment of this application, which includes a memory, a processor, and a computer program stored in the memory and that can be run in the processor, and the processor implements steps of the method for adapting the application interface described above when executing the program.

Another aspect of this application provides a non-transitory computer-readable storage medium in an embodiment of this application with a computer program executable by a computer device stored, which, when executed on the computer device, causes the computer device to execute steps of the method for adapting the application interface described above.

In some embodiments of this application, with a reference of the reference virtual pixel size of the interface element being equal to the adapted virtual pixel size of the interface element, the first physical size of the interface element in the adapted application interface is determined by combining a relationship among the virtual pixel size, a pixel size and a dot density of the interface element, to ensure that a first physical size of each interface element in the adapted application interface presented in the adapted application interface is the same as a second physical size of a corresponding interface element correspondingly presented in the reference application interface, so that visual presentation effect of respective interface elements in the adapted application interface displayed on the screen to be adapted is the same as that of corresponding respective interface elements in the reference application interface displayed on the reference screen, and also to ensure that visual presentation effect of interface elements in the adapted application interface presented on different terminal devices is the same, thereby improving use experience of the object. Secondly, by standardizing the screen to be adapted, a set of reference application interfaces can meet adaptation requirements of different screens such as those in cars, tablets and mobile phones, and avoid resource waste caused by repeated design of the reference application interfaces. In addition, after physical adaptation of an information guidance area and a control area in the application interface, the information guidance area and the control area are further dynamically adjusted (including left-right adapted and up-down adapted). Meanwhile, a displaying position of the control area in the application interface is adjusted, which increases control of details and makes more reasonable use of space of the application interface.

BRIEF DESCRIPTION OF THE DRAWINGS

To describe the technical solutions of some embodiments of this application more clearly, the following briefly introduces the accompanying drawings required for describing the embodiments. Apparently, the accompanying drawings in the following description show only some embodiments of this application.

DESCRIPTION OF EMBODIMENTS

Figure 1:
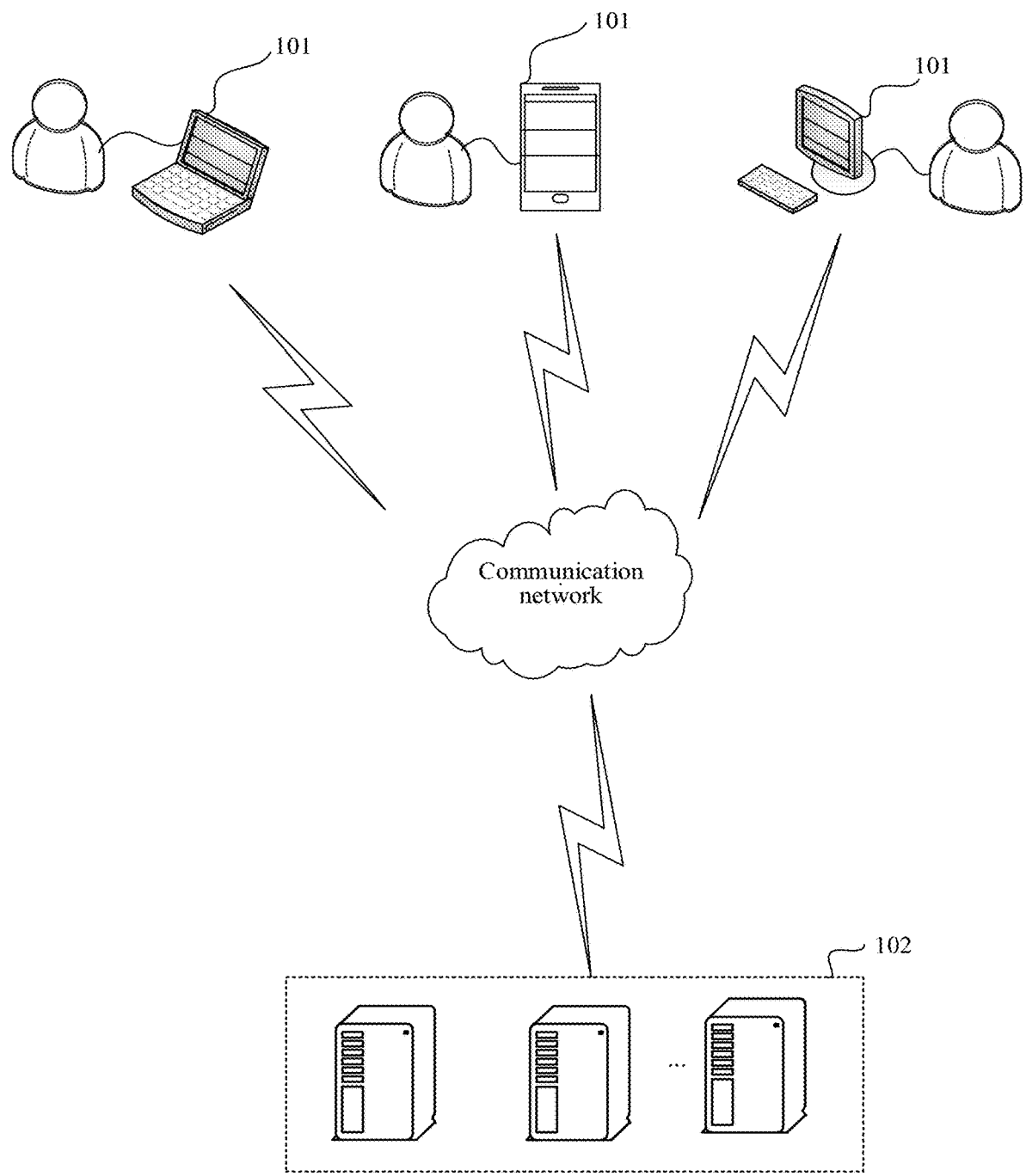
FIG. 1 is a schematic diagram of a system architecture according to an embodiment of this application.

To make the objectives, technical solutions, and beneficial effects of this application clearer, the following further describes this application in detail with reference to the accompanying drawings and the embodiments. It is to be understood that the specific embodiments described herein are merely used to explain this application but are not intended to limit this application.

The follows explains terms involved in describing the embodiments of this application.

Application interface: it can also be called a User Interface (UI), which is a medium for interaction and information exchange between the system and users, with a purpose of enabling the users to operate hardware conveniently and efficiently to achieve two-way interaction and complete work desired to accomplish with aid of hardware.

dpi: dot per inch, namely a number of dots per inch, also known as a dot density, which is a measure unit of a resolution of a printer, a mouse or other devices, that is, pixel per inch. A calculation formula of dpi is as shown as formula (1) in the following:

$$dpi = sqrt(X^2 + Y^2)/C \qquad (1)$$

where X and Y represent a width and a height in a screen resolution, respectively, and C represents a diagonal length of the screen in feet.

ppi: pixel per inch, the number of pixels per inch, that is, the pixel density.

density: which refers to a screen density, and density=dpi of a screen/160.

dp: which is a virtual pixel unit, 1 dp refers to 1 pixel on a screen with dpi of 160, 2 pixels on a screen with dpi of 320 and 3 pixels on a screen with dpi of 480.

A relationship between the pixel size of an interface element, a virtual pixel size and a dot density of the screen is shown in the following formula (2):

$$p = d*(dpi/160) \qquad (2)$$

where, p represents the pixel size of the interface element, in px; and d represents the virtual pixel size of the interface element, in dp.

Pixel size: which refers to a size characterized by a number of occupied pixels. For example, if an interface element in the application interface occupies 3 pixels in a width direction and 3 pixels in a height direction, a pixel size of the interface element is 3 px*3 px.

Physical size: which refers to a size measured by a physical method, which is a visible size. For example, by physically measuring an interface element displayed on the screen, a physical size of the interface element is obtained as: 0.1 inch*0.1 inch.

Design concept of some embodiments of this application is introduced below.

In related art, a reference application interface of an application generally corresponds to a reference resolution of a reference screen, for example, 1280 px*720 px, and resolutions to be adapted corresponding to screens to be adapted of different terminal devices may be different. Therefore, in order to adapt to the different terminal devices, in related art, physical sizes of interface elements presented in the reference application interface are adjusted correspondingly based on proportional relationships between the reference resolution and respective different resolutions to be adapted, to obtain adapted application interfaces displayed on the different terminal devices.

Because resolutions to be adapted corresponding to the different terminal devices are different, proportional relationships between the different resolutions to be adapted and the reference resolution are also different. Therefore, the adapted application interfaces obtained by adjusting the physical sizes of the interface elements in the same reference application interface using the different proportional relationships are also different, that is, the physical sizes of the interface elements in the adapted application interfaces presented on the different terminal devices are different, which further affects visual presentation effect of the application interface.

Considering that a screen to be adapted often corresponds to two properties, namely, a resolution to be adapted and a dot density to be adapted. When the adapted application interface is displayed with the screen to be adapted, physical sizes of interface elements in the adapted application interface are not only related to the resolution to be adapted, but also related to the dot density to be adapted. Therefore, it is necessary to adjust the physical sizes of the interface elements in combination with association between the resolution to be adapted and a reference resolution and association between the dot density to be adapted and a reference dot density, to ensure that physical sizes of the interface elements presented in the adapted application interface are the same as those of the interface elements correspondingly presented in the reference application interface, and further realize an effect that physical sizes of the interface elements in the adapted application interfaces presented on different terminal devices are the same.

In order to further simplify the process of adjusting physical sizes of the interface elements, a virtual pixel size is obtained based on two parameters, namely, a resolution and a dot density. Then, for each interface element, with a reference of a reference virtual pixel size of the interface element being equal to an adapted virtual pixel size of the interface element, a physical size of an interface element of the reference application interface is adjusted to obtain the adapted application interface, to realize that physical sizes of the interface elements presented in the adapted application interface are the same as those of the interface elements correspondingly presented in the reference application interface.

Based on the above concept, a method for adapting an application interface is provided in an embodiment of this application. The method includes: acquiring a trigger operation for an application to be displayed on a screen to be adapted; and displaying an adapted application interface of the application to be displayed through the screen to be adapted in response to the trigger operation, the adapted application interface including a plurality of interface elements, and for an interface element of the plurality of interface elements, a first physical size of the interface element presented in the adapted application interface being the same as a second physical size presented in a reference application interface; and the first physical size of the interface element being determined based on an adapted virtual pixel size of the interface element in the adapted application interface and a dot density to be adapted of the screen to be adapted, and the adapted virtual pixel size being the same as a reference virtual pixel size of the interface element in the reference application interface.

In some embodiments of this application, with a reference of the reference virtual pixel size of the interface element being equal to the adapted virtual pixel size of the interface element, the first physical size of the interface element in the adapted application interface is determined by combining a relationship among the virtual pixel size, a pixel size and a dot density of the interface element, to ensure that a first physical size of each interface element in the adapted application interface presented in the adapted application interface is the same as a second physical size of a corresponding interface element correspondingly presented in the reference application interface, so that visual presentation effect of respective interface elements in the adapted application interface displayed on the screen to be adapted is the same as that of corresponding respective interface elements in the reference application interface displayed on the reference screen, and also to ensure that visual presentation effect of interface elements in the adapted application interface presented on different terminal devices is the same, thereby improving use experience of the object.

Referring to FIG. 1, which is a diagram of a system architecture in which some embodiments of this application is applicable. The system architecture includes at least a terminal device 101 and a server 102. There may be one or more terminal devices 101. There also may be one or more servers 102. The number of terminal devices 101 and servers 102 are not limited in this application.

An application to be displayed is pre-installed in terminal device 101. The application to be displayed can be a client application, a web version application, an applet application, or the like in type. The application to be displayed can be, for example, a map application, a car networking application, an instant messaging application, a shopping application, etc. The terminal device 101 may be a smart phone, a tablet computer, a notebook computer, a desktop computer, a smart home appliance, an intelligent voice interaction device, an intelligent vehicle-mounted device, etc., which is not limited thereto.

The server 102 is a back-end server of the application to be displayed. The server 102 can be an independent physical server, can be a server cluster or a distributed system composed of multiple physical servers, or can also be a cloud server providing basic cloud computing services such as cloud service, cloud database, cloud computing, cloud function, cloud storage, network service, cloud communication, middleware service, domain name service, security service, Content Delivery Network (CDN), big data and artificial intelligence platform. The terminal device 101 and the server 102 can be directly or indirectly connected by wired or wireless communication, which is not limited in this application.

The method for adjusting the interface layout in some embodiments of this application may be executed by the terminal device 101, the server 102, or interactively executed by the terminal device 101 and the server 102.

For example, the method for adjusting the interface layout in some embodiments of this application is executed by the terminal device 101 is taken for illustration, the method includes following steps.

The application to be displayed is pre-installed in the terminal device 101, and the terminal device 101 acquires a trigger operation for an application to be displayed on a screen to be adapted and displays an adapted application interface of the application to be displayed through the screen to be adapted in response to the trigger operation. The adapted application interface includes a plurality of interface elements, and for each of the plurality of interface elements, a first physical size of the interface element presented in the adapted application interface is the same as a second physical size presented in a reference application interface. The first physical size of the interface element is determined based on an adapted virtual pixel size of the interface element in the adapted application interface and a dot density to be adapted of the screen to be adapted, and the adapted virtual pixel size is the same as a reference virtual pixel size of the interface element in the reference application interface.

In some embodiments, the method for adjusting the interface layout in some embodiments of this application can be applied to interface layout adjustment of a map application, a car networking application, an instant messaging application, a shopping application and other applications.

Figure 2:
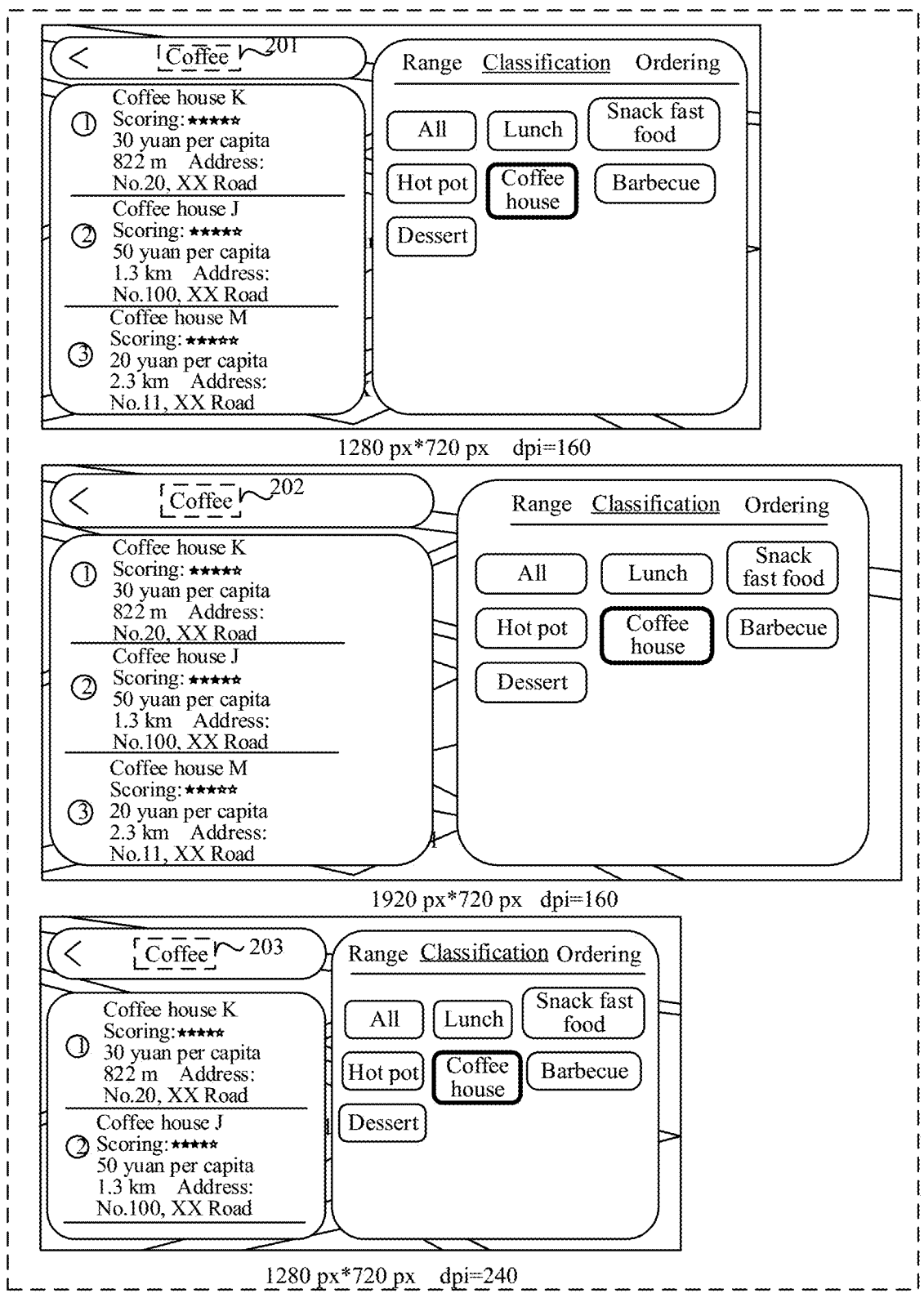
FIG. 2 is a schematic diagram of an application scenario according to an embodiment of this application.

Taking the map application as an example and as shown in FIG. 2, the reference application interface is displayed on the reference screen. The reference resolution of the reference screen is 1280 px*720 px, and dpi of the reference screen is 160. Taking interface element 201 as an example, the interface element 201 is a text "coffee", and a physical size of the interface element 201 presented in the reference application interface is set to be 5 cm*2 cm.

The first adapted application interface is displayed on the first screen to be adapted. A reference resolution of the first screen to be adapted is 1920 px*720 px, and the dpi of the reference screen is 160. At this time, a physical size of an interface element 202 corresponding to the interface element 201 presented in the first adapted application interface is 5 cm*2 cm, that is, the same interface element has same visual presentation effect on two screens with different resolutions and with same dpi.

A second adapted application interface displayed on a second screen to be adapted. A reference resolution of the second screen to be adapted is 1280 px*720 px, and dpi of the reference screen is 320. At this time, a physical size of the interface element 203 corresponding to the interface element 201 presented in the second adapted application interface is 5 cm*2 cm, that is, the same interface element has same visual presentation effect on two screens with same resolutions and different dpi.

It is to be understood that in scenario description of the above embodiment, only the interface element 201 in the reference application interface is taken as an example, and other interface elements can be adjusted in a same way as the interface element 201. In addition, visual presentation effect of the same interface element on two screens with different resolutions and dpi is also the same, which is not repeatedly described here again.

Figure 3:
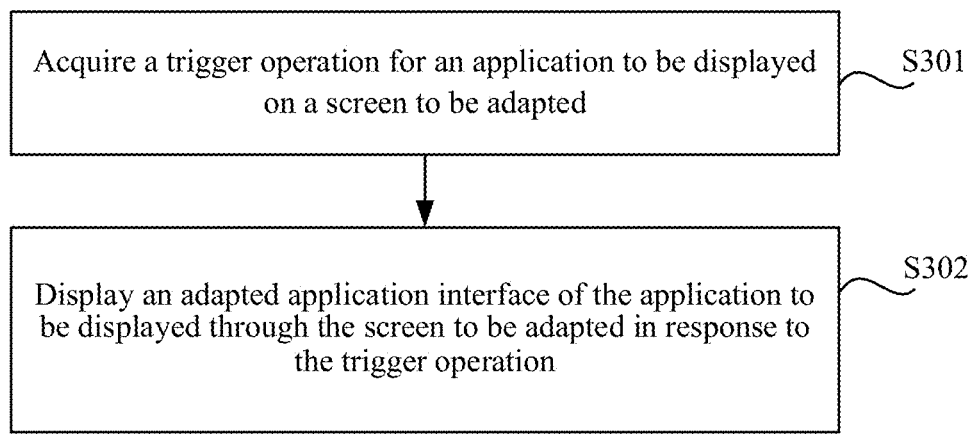
FIG. 3 is a schematic flowchart of a method for adapting an application interface according to an embodiment of this application.

Based on the system architecture diagram shown in FIG. 1, a flow of the method for adjusting the interface layout is provided in some embodiments of this application. As shown in FIG. 3, the flow of the method is executed by a computer device, which may be the terminal device 101 and/or the server 102 shown in FIG. 1, and includes the following steps.

S301: Acquire a trigger operation for an application to be displayed on a screen to be adapted.

In some embodiments of this application, the application to be displayed can be a map application, a car networking application, an instant messaging application, a shopping application, etc. In some embodiments, in order to bear services and reduce page coupling of the application to be displayed, the application to be displayed is divided into a plurality of service levels in some embodiments of this application, that is, the application to be displayed includes a plurality of independent service levels, which include a notification layer, a branch layer, a mainline layer, a control layer and a base map layer, and each service level bears a different service function, with jumping logic and public relations among the service levels being preset.

In some embodiments of this application, interface elements related to different services are located at different service levels, and in adjusting physical sizes of the interface elements, it is only necessary to adjust the service levels associated with the interface elements without adjusting all of the service levels, thus improving flexibility of adjustment of the interface elements and coupling of application interfaces.

Figure 4:
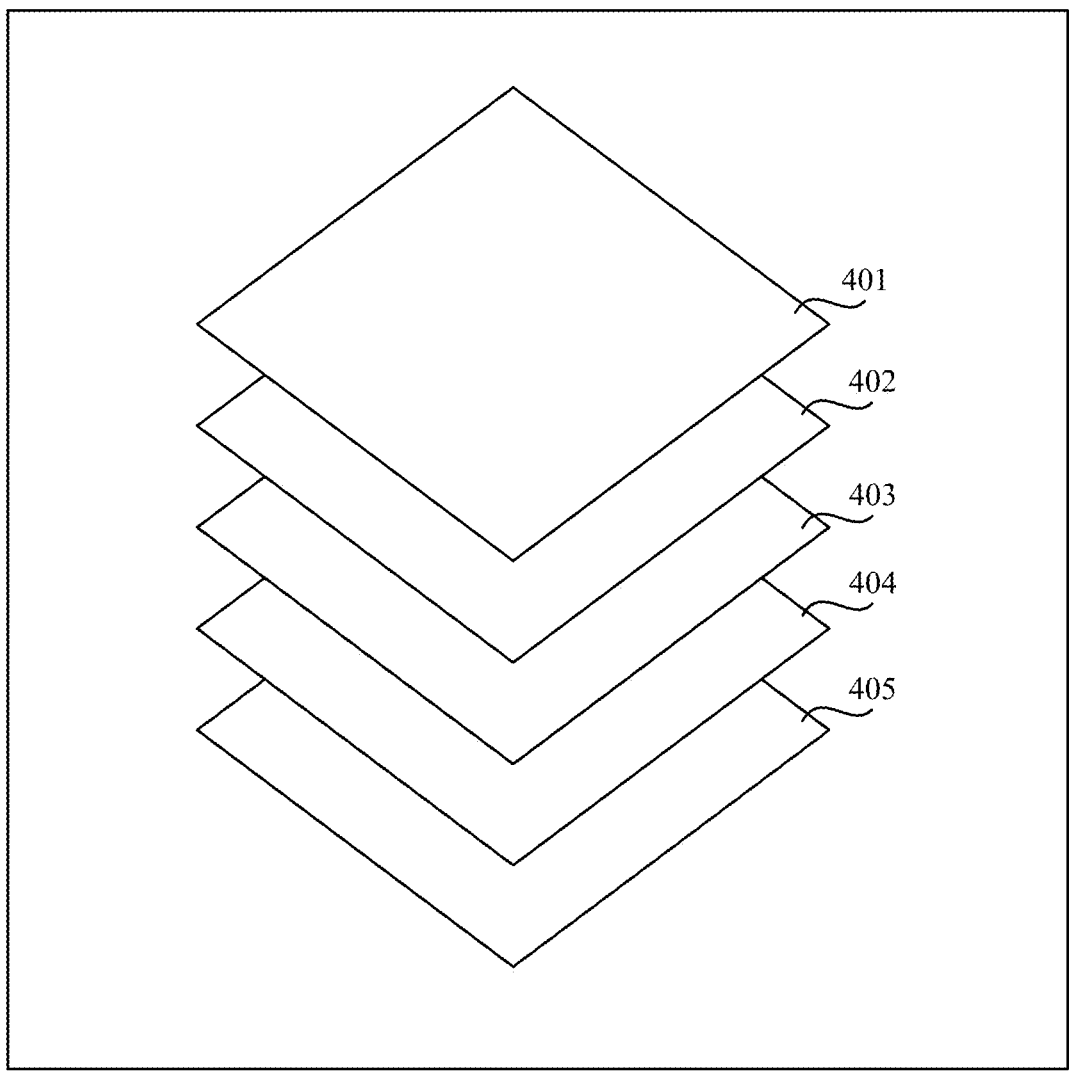
FIG. 4 is a schematic diagram of a service layering according to an embodiment of this application.

Taking the application to be displayed as a map application as an example and as shown in FIG. 4, the map application is divided into five service levels, namely, a notification layer 401, a branch layer 402, a mainline layer 403, a control layer 404 and a base map layer 405 from top to bottom.

The notification layer 401 mainly bears notifications and functions with global attributes, and floats above the branch layer without affecting the layout of other service layers. The notification layer 401 is represented in the form of a dialog box, a movable pop-up window, or the like.

The branch layer 402 mainly bears temporarily occurring branch tasks. The branch tasks are usually a single task flow with an independent operation page, which can be evoked from any scenario, and exit a current branch page after the branch task is completed.

The mainline layer 403, also called a function layer or a scenario layer, bears functions in different service scenarios. For example, it can be a navigation function in a navigation scenario or a path planning function in a path planning scenario.

The control layer 404 mainly bears an interacting function through controls. For example, in a base map interactive function, the control layer provides controls such as base map overview and base map zoom. In the navigation scenario, it provides navigation-related controls.

The base map layer 405 mainly bears basic map information and guidance information, such as a road network, road conditions and navigation routes.

In some embodiments of this application, the application to be displayed is subjected to service layering to obtain a plurality of independent service levels, which reduces service coupling. Therefore, in adjusting physical sizes of the interface elements, it is only necessary to adjust the service levels associated with the interface elements without adjusting all of the service levels, thus improving flexibility of adjustment of the interface elements. Secondly, with the service layering of the application to be displayed, a clarity of service logic is improved, implementing of basic components on a technical level can be facilitated, and maintenance cost on the technical level can be reduced, thus achieving a purpose of reducing cost and increasing efficiency.

It can be understood that the trigger operation can be an operation that can trigger displaying of the application to be displayed, for example, the trigger operation can be a click operation, a double click operation, a slide operation or the like.

S302: Display an adapted application interface of the application to be displayed through the screen to be adapted in response to the trigger operation.

The adapted application interface includes a plurality of interface elements, and for each of the plurality of interface elements, a first physical size of the interface element presented in the adapted application interface is the same as a second physical size presented in a reference application interface. The first physical size of the interface element is determined based on an adapted virtual pixel size of the interface element in the adapted application interface and a dot density to be adapted of the screen to be adapted, and the adapted virtual pixel size is the same as a reference virtual pixel size of the interface element in the reference application interface.

A resolution to be adapted of the screen to be adapted may be the same as or different from a reference resolution of the reference screen. A dot density to be adapted of the screen to be adapted may be the same as or different from a reference dot density of the reference screen.

In some embodiments, the interface elements may be text, images, videos, etc. Each of the first physical sizes is determined based on an adapted virtual pixel size of the interface element in the adapted application interface and a dot density to be adapted of the screen to be adapted, and the adapted virtual pixel size is the same as a reference virtual pixel size of the interface element in the reference application interface. The reference virtual pixel size of the interface element is obtained by substituting the pixel size of the interface element and the reference dot density of the reference application interface into the above formula (2).

In some embodiments of this application, with a reference of the reference virtual pixel size of the interface element being equal to the adapted virtual pixel size of the interface element, the first physical size of the interface element in the adapted application interface is determined by combining a relationship among the virtual pixel size, a pixel size and a dot density of the interface element, to ensure that a first physical size of each interface element in the adapted application interface presented in the adapted application interface is the same as a second physical size of a corresponding interface element correspondingly presented in the reference application interface, so that visual presentation effect of respective interface elements in the adapted application interface displayed on the screen to be adapted is the same as that of corresponding respective interface elements in the reference application interface displayed on the reference screen, and also to ensure that visual presentation effect of interface elements in the adapted application interface presented on different terminal devices is the same, thereby improving use experience of the object.

In one embodiment, in Step S302 above, the first physical size of each of the interface elements presented in the adapted application interface is determined in a following way.

A corresponding adapted pixel size of the interface element in the adapted application interface is determined based on the adapted virtual pixel size of the interface element and the dot density to be adapted of the adapted application interface. Then, the first physical size of the interface element presented in the adapted application interface is determined based on the adapted pixel size of the interface element.

It is to be understood that a virtual pixel is also called a device-independent pixel. Because respective interface elements in the reference application interface are designed with the virtual pixel as a measuring unit, that is, a reference virtual pixel size of the interface element in the reference application interface determines the second physical size of the interface element presented in the reference application interface.

In order to ensure that the first physical size of the interface element presented in the adapted application interface is the same as the second physical size presented in the reference application interface, the adapted virtual pixel size of the interface element in the adapted application interface needs to be the same as the reference virtual pixel size of the interface elements in the reference application interface. By substituting the adapted virtual pixel size and the dot density to be adapted of the screen to be adapted into the above formula (2), the corresponding adapted pixel size of the interface element in the adapted application interface can be obtained. Then, the first physical size of the interface element presented in the adapted application interface can be obtained based on the physical size of a unit pixel and the adapted pixel size of the interface element.

Figure 5:
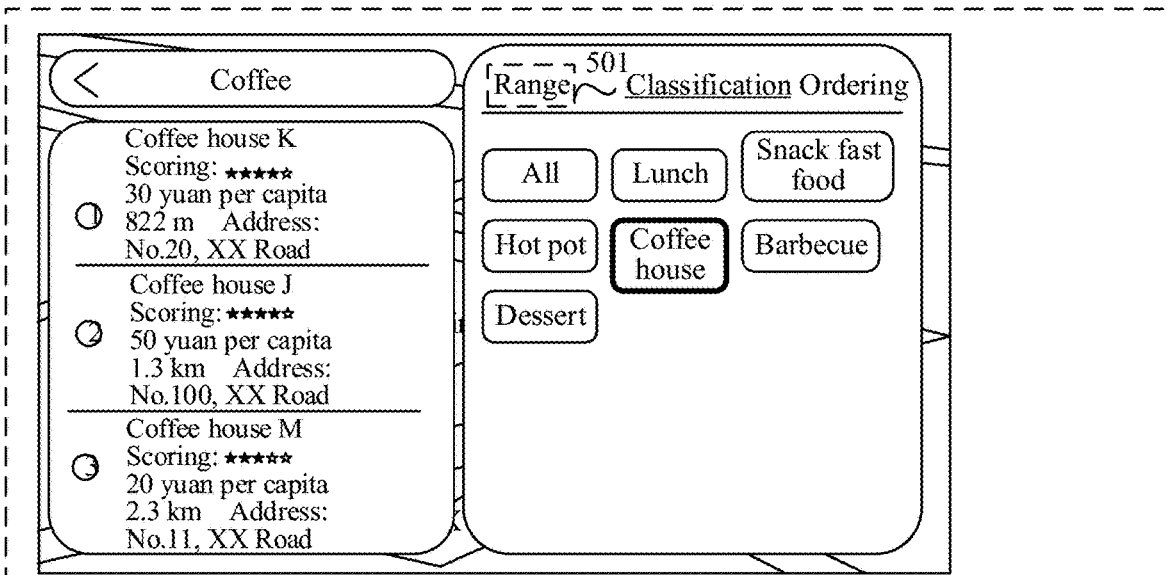
FIG. 5 is a schematic diagram of a reference application interface and an adapted application interface according to an embodiment of this application.
Figure 5:
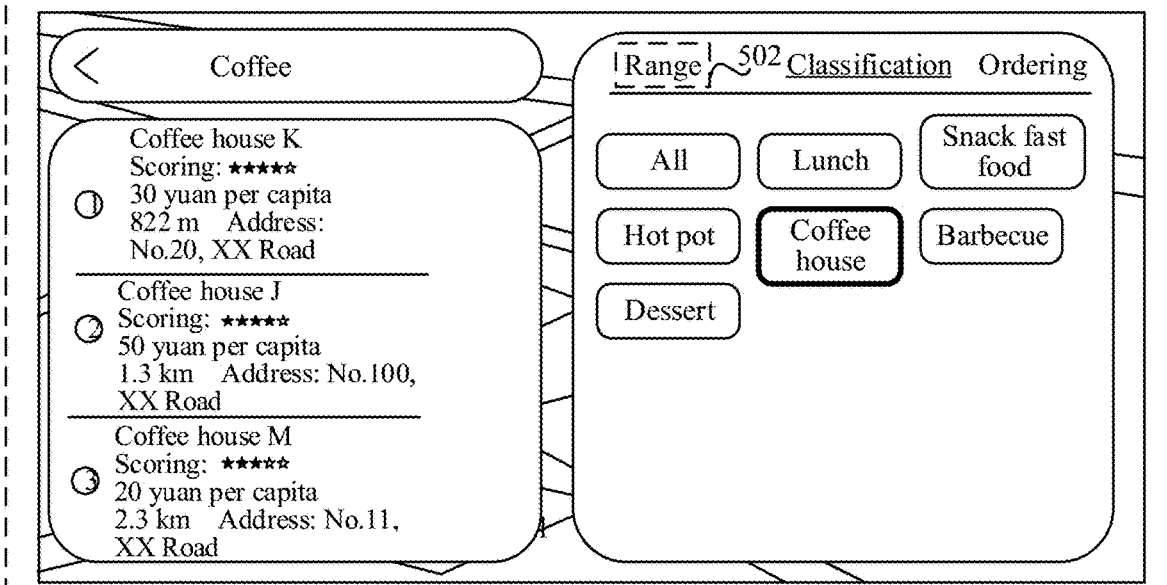

Taking the map application as an example and as shown in FIG. 5, the reference application interface is displayed on the reference screen. The reference resolution of the reference screen is 1280 px*720 px, and dpi of the reference screen is 160, and the physical size of the unit pixel is $1/160 * 1/160$ (in feet). At this time, if the interface element 501 is a text "range", the reference virtual pixel size of the interface element 501 in the reference application interface is 10 dp*10 dp, and the reference pixel size is 10 px*10 px, then the second physical size of the interface element 501 presented in the reference application interface is $1/16 * 1/16$ (in feet).

The adapted application interface is displayed on the screen to be adapted. The resolution to be adapted of the screen to be adapted is 1920 px*720 px, dpi of the screen to be adapted is 160, and the physical size of the unit pixel is $1/160 * 1/160$ (in feet). At this time, the adapted virtual pixel size of the interface element 502 corresponding to the interface element 501 in the adapted application interface is the same as the reference virtual pixel size of the interface element 501, that is, 10 dp*10 dp. By substituting the adapted virtual pixel size of the interface element 502 and the dpi of the screen to be adapted into the above formula (2), the adapted pixel size of the interface element 502 is obtained to be 10 px*10 px.

The first physical size of the interface element in the adapted application interface is obtained to be $1/16 * 1/16$ (in feet) based on the physical size of the unit pixel ($1/160 * 1/160$) and the adapted pixel size (10 px*10 px), that is, the first physical size of the interface element 501 presented in the adapted application interface is the same as the second physical size of the corresponding interface element 502 correspondingly presented in the reference application interface.

Figure 6:
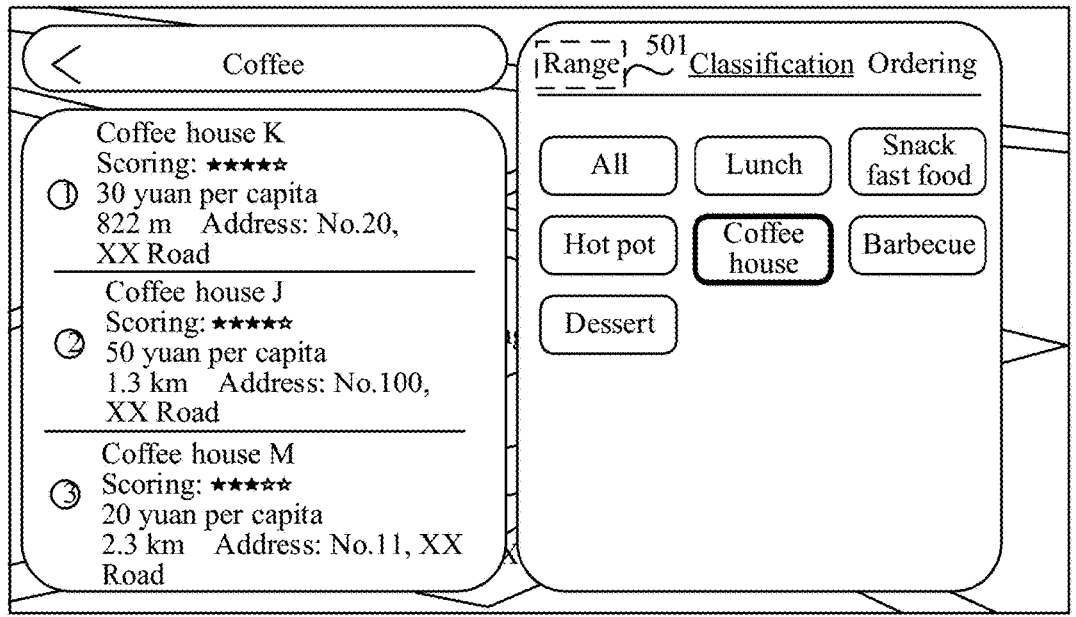
FIG. 6 is another schematic diagram of a reference application interface and an adapted application interface according to an embodiment of this application.
Figure 6:
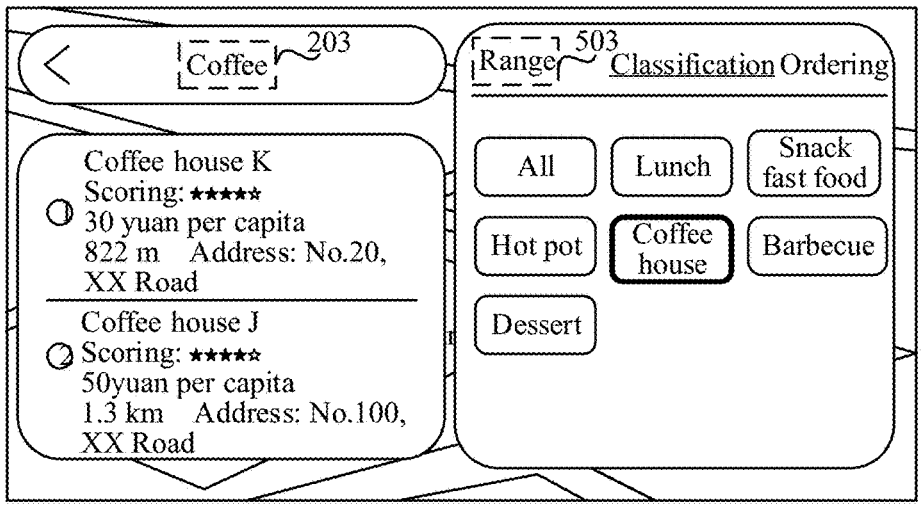

Taking the map application as an example and as shown in FIG. 6, the reference application interface is displayed on the reference screen. The reference resolution of the reference screen is 1280 px*720 px, and dpi of the reference screen is 160, and the physical size of the unit pixel is $1/160 * 1/160$ (in feet). At this time, if the interface element 501 is a text "range", the reference virtual pixel size of the interface element 501 in the reference application interface is 10 dp*10 dp, and the reference pixel size is 10 px*10 px, then the second physical size of the interface element 501 presented in the reference application interface is $1/16 * 1/16$ (in feet).

The adapted application interface is displayed on the screen to be adapted. A reference resolution of the screen to be adapted is 1280 px*720 px, dpi of the screen to be adapted is 320, and a physical size of each pixel is $1/320 * 1/320$ (in feet). At this time, the adapted virtual pixel size of the interface element 503 corresponding to the interface element 501 in the adapted application interface is the same as the reference virtual pixel size of the interface element 501, that is, 10 dp*10 dp. By substituting the adapted virtual pixel size of the interface element 503 and the dpi of the screen to be adapted into the above formula (2), the adapted pixel size of the interface element 503 in the adapted application interface can be obtained to be 20 px*20 px.

The first physical size of the interface element in the adapted application interface is obtained to be $1/16 * 1/16$ (in feet) based on the physical size of the unit pixel ($1/320 * 1/320$) and the adapted pixel size (20 px*20 px) of the interface element 503, that is, the first physical size of the interface element 501 presented in the adapted application interface is the same as the second physical size of the corresponding interface element 503 correspondingly presented in the reference application interface.

In some embodiments of this application, the adapted virtual pixel size of the interface element is set as the corresponding reference virtual pixel size of the interface element in the reference application interface to ensure that the physical size of the interface element presented in the adapted application interface is the same as the physical size of the interface element presented in the reference application interface, and then a number of pixels occupied by the interface element is determined based on the adapted virtual pixel size of the interface element and the dot density to be adapted of the screen to be adapted. Then, the first physical size of the interface element presented in the adapted application interface is determined based on the number of pixels and the physical size of the unit pixel, thereby improving efficiency of adjusting the physical size of the interface element and improving visual presentation effect of the interface element.

In one embodiment, there are two types of screens with completely different screen widths in practical application scenarios, one type is a screen that is wide such as a tablet computer screen and a car screen, and a screen width of this type of screen ranges from 600 dp to 1080 dp. The other type is a screen with a small width such as a mobile phone screen, a screen width of this type of screen ranges from 300 dp to 500 dp. In these two types of screens with completely different screen width ranges, if they are adapted with one reference application interface, content may be out of range horizontally or vertically. In this case, in order to avoid resource waste when designing different reference application interfaces for screens with different screen widths, in this embodiment of the application, before adapting the application interface for the screen to be adapted, an original dot density of the screen to be adapted can be standardized to obtain the dot density to be adapted, to ensure that the reference application interface can be adapted to the screen to be adapted. The dot density to be adapted for the screen to be adapted is determined in the following ways.

An effective width and effective height of the screen to be adapted are determined based on the resolution to be adapted of the screen to be adapted and an original screen density of the screen to be adapted. Then, a standardization direction of the screen to be adapted is determined based on a first difference degree between the effective width and a reference width of the reference screen and a second difference degree between the effective height and a reference height of the reference screen. An original pixel density of the screen to be adapted is adjusted to obtain the dot density to be adapted based on the standardization direction.

In one embodiment, the resolution to be adapted of the screen to be adapted involves the width to be adapted and the height to be adapted. The width to be adapted represents a number of pixels of the screen to be adapted in a width direction and the height to be adapted represents a number of pixels of the screen to be adapted in a height direction. A ratio of the width to be adapted to the original screen density of the screen to be adapted is taken as the effective width, and a ratio of the height to be adapted of the screen to be adapted to the original screen density is taken as the effective height. The effective width and effective height of the screen to be adapted constitute the adapted virtual pixel size of the screen to be adapted.

For example, if the resolution to be adapted of the screen to be adapted is set to be 1920 px*720 px and the original screen density to be 1, the width to be adapted of the screen to be adapted is 1920 px, a height to be adapted of the screen to be adapted is 720 px, the effective width of the screen to be adapted is 1920 dp and the effective height of the screen to be adapted is 720 dp.

In some embodiments of this application, the screen to be adapted is standardized and adjusted, so that screens with different widths can be adapted to one reference application interface, thus avoiding resource waste caused by repeatedly designing the reference application interface, ensuring uniformity of physical sizes of interface elements displayed on different screens to be adapted, and improving the visual presentation effect of the interface elements.

In one embodiment, a first difference degree is determined based on a ratio of the effective width to the reference width. A second difference degree is determined based on a ratio of the effective height to the reference height.

The reference resolution of the reference screen involves a reference width and a reference height of the reference screen. The reference width represents a number of pixels of the reference screen in the width direction and the reference height represents a number of pixels of the screen to be adapted in the height direction. Since the reference screen density of the reference screen is 1 by default, the reference width of the reference screen is the same as the effective width of the reference screen and the reference height of the reference screen is the same as the effective height of the reference screen. The effective width and the effective height of the reference screen constitute the reference virtual pixel size of the reference screen.

If the first difference degree or the second difference degree is less than 1, it indicates that the screen to be adapted cannot be directly adapted to the reference application interface, and the screen to be adapted needs to be standardized in advance, that is, the standardization direction of the screen to be adapted is determined based on the first difference degree and the second difference degree, and the original pixel density of the screen to be adapted is adjusted based on the standardization direction to obtain the dot density to be adapted.

If the first difference degree or the second difference degree is greater than 1, it indicates that the screen to be adapted can be directly adapted to the reference application interface, so there is no need to standardize the screen to be adapted.

In selecting the standardization direction based on the first difference degree and the second difference degree, this application at least provides the following implementations.

If the first difference degree is greater than the second difference degree, the height direction is taken as the standardization direction of the screen to be adapted. If the first difference degree is less than or equal to the second difference degree, the width direction is taken as the standardization direction of the screen to be adapted.

In some embodiments of this application, it is determined whether the screen to be adapted can be adapted to the reference application interface based on a size relationship of the effective width of the screen to be adapted and the reference width of the reference screen and a size relationship between the effective height of the screen to be adapted and the reference height of the reference screen, and if not, a direction with a greater difference from the width direction and the length direction is selected as the standardization direction, to ensure that when the adapted application interface is displayed in the screen to be adapted, content may not be out of range horizontally or vertically.

In one embodiment, when the original pixel density of the screen to be adapted is adjusted to obtain the dot density to be adapted based on the standardization direction, some embodiments of this application at least provides the following implementations.

A number of pixels to be adapted corresponding to the screen to be adapted in the standardization direction is determined based on the resolution to be adapted. Then, the original screen density is adjusted to obtain a screen to be adapted density based on the number of pixels to be adapted and a number of reference pixels corresponding to the reference screen in the standardization direction. Then, the original pixel density is adjusted to determine the dot density to be adapted based on the screen to be adapted density and the reference dot density of the reference screen.

There are many ways to determine the screen to be adapted density and the dot density to be adapted. For example, a ratio of the number of the pixels to be adapted to the number of reference pixels can be used as the screen to be adapted density. Then a product of the screen to be adapted density and the reference dot density is taken as the dot density to be adapted.

For example, the reference resolution of the reference screen is set to be 1280 px*720 px, the dpi of the reference screen to be 160, and the reference screen density of the reference screen to be 1. The resolution to be adapted of the screen to be adapted is 3200 px*1440 px, the dpi of the screen to be adapted is 480, and the original screen density of the screen to be adapted is 3.

The ratio of the width to be adapted to the original screen density of the screen to be adapted is calculated to obtain the effective width of the screen to be adapted to be 1066 dp. The ratio of the height to be adapted to the original screen density of the screen to be adapted is calculated to obtain the effective height of the screen to be adapted to be 480 dp.

A ratio of the effective width of the screen to be adapted to the reference width of the reference screen is calculated to obtain a first difference degree to be 0.833. A ratio of the effective height of the screen to be adapted to the reference height of the reference screen is calculated to obtain a second difference degree to be 0.667. Since both the first difference degree and the second difference degree are less than 1, it is necessary to standardize the screen to be adapted. Since the first difference degree is greater than the second difference degree, the height direction is taken as the standardization direction.

A ratio of the number of the pixels to be adapted in the height direction of the screen to be adapted to the number of reference pixels of the reference screen in the height direction is calculated to obtain the screen to be adapted density to be 2. Then, the product of the screen to be adapted density and the reference dot density is calculated to obtain the dot density to be adapted of the screen to be adapted to be 320. At this time, an effective width of the adjusted screen to be adapted is 1600 dp, and an effective height of the adjusted screen to be adapted is 720 dp. Accordingly, after the adjusted first difference degree and second difference degree are calculated based on the adjusted effective width and effective height, at this time, the adjusted first difference degree and second difference degree are both greater than 1, that is, the screen to be adapted at this time can be adapted to the reference application interface to obtain an adapted application interface.

In some embodiments of this application, the screen to be adapted is standardized and adjusted, so that screens with different widths can be adapted to one reference application interface, thus avoiding resource waste caused by repeatedly designing the reference application interface, ensuring uniformity of physical sizes of interface elements displayed on different screens to be adapted, and improving the visual presentation effect of the interface elements.

In one embodiment, the adapted application interface further includes multiple adapted information guidance areas, and each of the adapted information guidance areas is used to display interface elements associated with a type of guidance information.

For each of the adapted information guidance areas, a physical width of the adapted information guidance area presented in the adapted application interface is determined according to an initial pixel size of the adapted information guidance area and the width to be adapted of the screen to be adapted. The initial pixel size of the adapted information guidance area is determined based on a reference virtual pixel size of a corresponding reference information guidance area in the reference application interface and the dot density to be adapted.

Physical heights of the adapted information guidance areas presented in the adapted application interface and a number of adaptations of the interface elements respectively displayed in the multiple adapted information guidance areas are determined according to the initial pixel size of the adapted information guidance area and the height to be adapted of the screen to be adapted.

Usually, the application interface can be divided into multiple functional areas in advance according to functional modules. The functional areas refer to information containers that bear the interface elements in the application interface, and the multiple functional areas include a control area and multiple information guidance areas, and the multiple information guidance areas include a dynamic information guidance area and a base map guidance area. Positions of multiple functional areas in the application interface can be set according to specific requirements.

Figure 7:
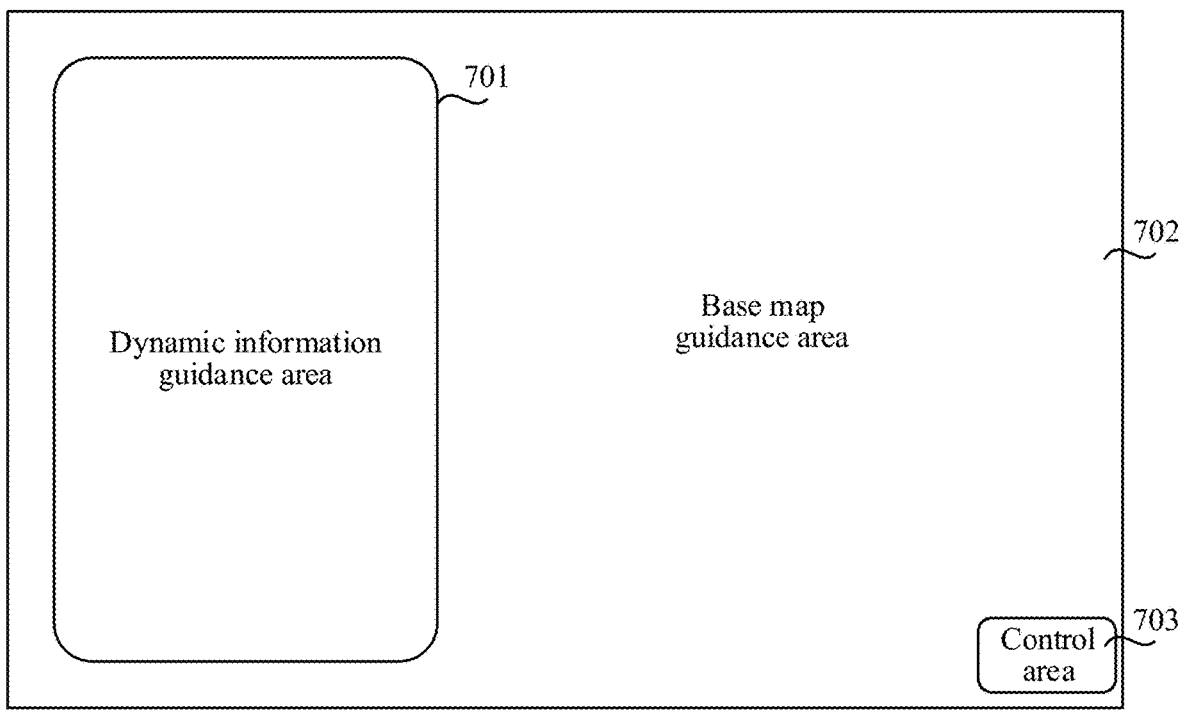
FIG. 7 is a schematic diagram of a function area according to an embodiment of the present application.

For example, as shown in FIG. 7, the application interface includes a dynamic information guidance area 701, a base map guidance area 702 and a control area 703.

In a process of adjusting the interface elements in the reference application interface to obtain the interface elements in the adapted application interface, respective reference functional areas in the reference application interface are adjusted in a same way to obtain respective adapted functional areas in the adapted application interface corresponding to the initial pixel size. The adapted functional area includes the adapted information guidance areas, an adapted control area and so on. An initial pixel size of the adapted functional area is determined based on a reference virtual pixel size of the reference functional area and the dot density to be adapted of the screen to be adapted. Then, the initial pixel size of the adapted functional area is dynamically adjusted to obtain a final adapted functional area in the adapted application interface.

It is to be understood that, A process of determining the initial pixel size of the adapted functional area based on the reference virtual pixel size of the reference functional area and the dot density to be adapted of the screen to be adapted is similar to a method of determining the adapted pixel size of the interface elements based on the reference virtual pixel size of the interface elements in the reference application interface and the dot density to be adapted of the screen to be adapted, which may not be repeatedly described here again. In dynamically adjusting the initial pixel size of the adapted functional area, only a pixel size of the information container, namely, the adapted functional area, is adjusted, in which pixel sizes of the interface elements in the adapted functional area are not adjusted. Therefore, a physical size of the adapted functional area may be different from that of a corresponding reference function area, but physical sizes of the interface elements in the adapted functional area are always the same as physical sizes of the interface elements in the corresponding reference functional area.

In some embodiments of this application, in a process of adjusting the interface elements in the reference application interface to obtain the interface elements in the adapted application interface, the reference information guidance area in the reference application interface is adjusted accordingly to obtain the initial adapted information guidance area in the adapted application interface, and then the initial adapted information guidance area is dynamically adjusted to make the adapted information guidance area more compatible with the adapted application interface, thereby improving the visual presentation effect.

In some embodiments, a physical width of each adapted information guidance area presented in the adapted application interface is determined in the following way.

A width adjustment range of the adapted information guidance area is determined based on a reference width range and the reference dot density of the reference screen. The initial pixel width of the adapted information guidance area is determined based on the initial pixel size. Then, the initial pixel width is adjusted to obtain a final pixel width of the adapted information guidance area based on the width to be adapted and the width adjustment range of the screen to be adapted, and the physical width of the adapted information guidance area presented in the adapted application interface is determined based on the final pixel width.

In one embodiment, the reference width range can be set, which corresponds to a preset dot density, such as dpi being preset to be 160. Then a ratio of the preset dot density corresponding to the reference width range to the reference dot density of the reference screen is taken as an adjustment ratio of the reference width range. Then, upper and lower boundary values of the reference width range are respectively multiplied by the adjustment ratio to obtain the width adjustment range of the adapted information guidance area.

A width value is selected from the width adjustment range based on the width to be adapted of the screen to be adapted according to a preset selection rule as a final pixel width of the adapted information guidance area in the adapted application interface. Then, the final pixel width is multiplied by the physical size of the unit pixel to obtain a physical width of the adapted information guidance area presented in the adapted application interface. The smaller the width to be adapted of the screen to be adapted, the smaller the physical width of the adapted information guidance area presented in the adapted application interface. The larger the width to be adapted of the screen to be adapted, the larger the physical width of the adapted information guidance area presented in the adapted application interface.

Figure 8:
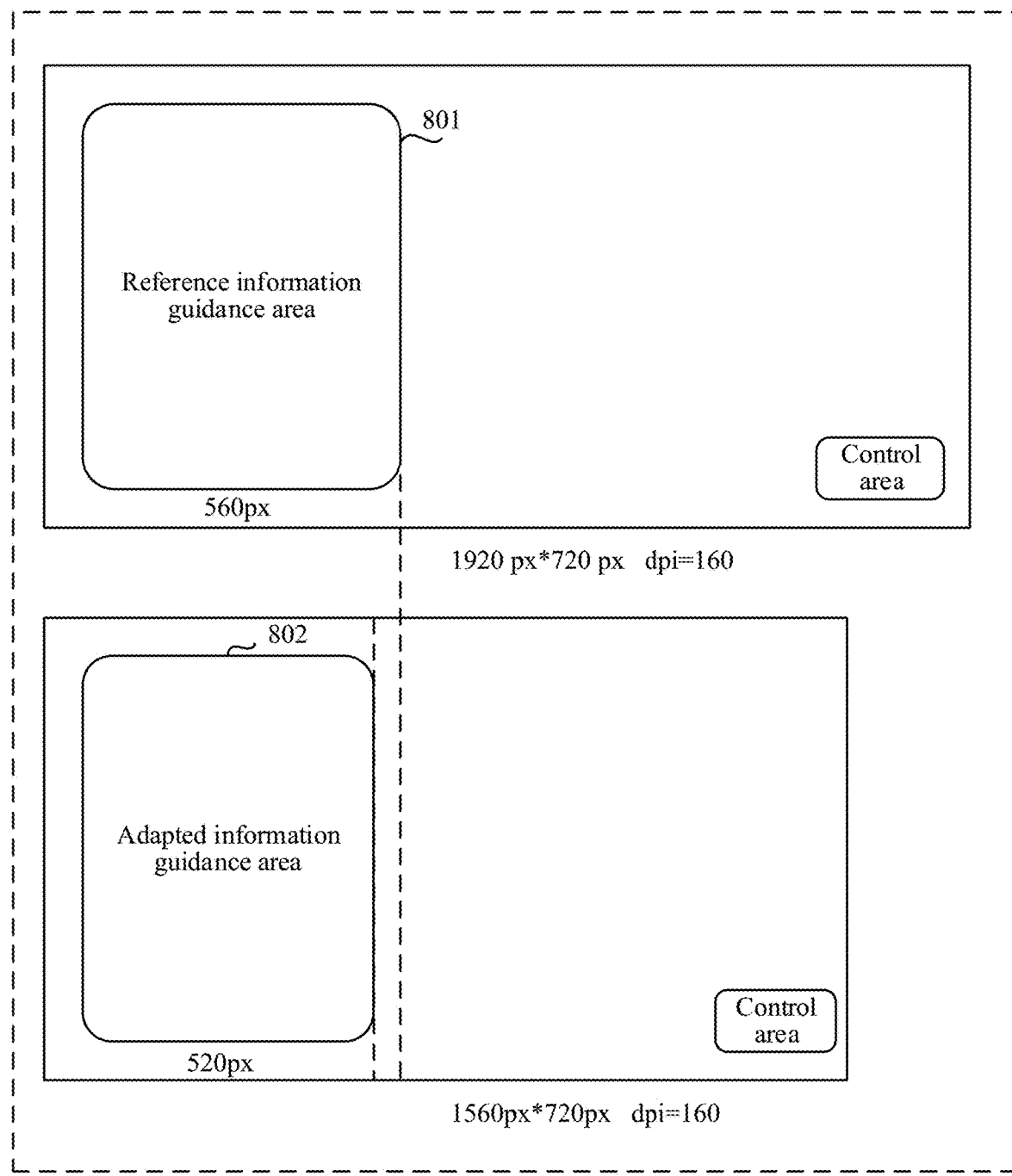
FIG. 8 is yet another schematic diagram of a reference application interface and an adapted application interface according to an embodiment of this application.

For example, as shown in FIG. 8, the reference resolution of the reference screen is set to be 1920 px*720 px, the reference dot density of the reference screen to be 160, the reference width range is 480 px to 560 px, and the preset dot density corresponding to the reference width range to be 160.

Since the reference dot density of the reference screen is the same as the preset dot density corresponding to the reference width range, the adjustment ratio of the reference width range is 1, and based on the adjustment ratio, a corresponding width adjustment range may be obtained to be 480 px to 560 px, and the pixel width of the reference information guidance area 801 is 560 px.

The preset selection rule is as follows.

When a screen width is less than 1440 px, the final pixel width of the adapted information guidance area in the adapted application interface is a minimum width MinN2 of the width adjustment range.

When the screen width is greater than or equal to 1440 px and less than 1660 px, the final pixel width of the adapted information guidance area in the adapted application interface is an average of the minimum width MinN2 and a maximum width MaxN2 of the width adjustment range.

When the screen width is greater than or equal to 1660 px, the final pixel width of the adapted information guidance area in the adapted application interface is the maximum width MaxN2 of the width adjustment range.

The resolution to be adapted of the screen to be adapted is set to be 1560 px*720 px, and the dot density to be adapted of the screen to be adapted is set to be 160. Since the dot density to be adapted of the screen to be adapted is the same as the reference dot density of the reference screen, the initial pixel size of the adapted information guidance area is the same as the reference pixel size of the reference information guidance area.

Since the width to be adapted of the screen to be adapted is 1560 px, the final pixel width of the adapted information guidance area 802 in the adapted application interface can be determined to be 520 px according to the above selection rule, the initial pixel width of 560 px of the adapted information guidance area 802 is adjusted to the final pixel width of 520 px, and finally the final pixel width is multiplied by the physical width of the unit pixel to obtain the physical width of the adapted information guidance area presented in the adapted application interface.

Figure 9:
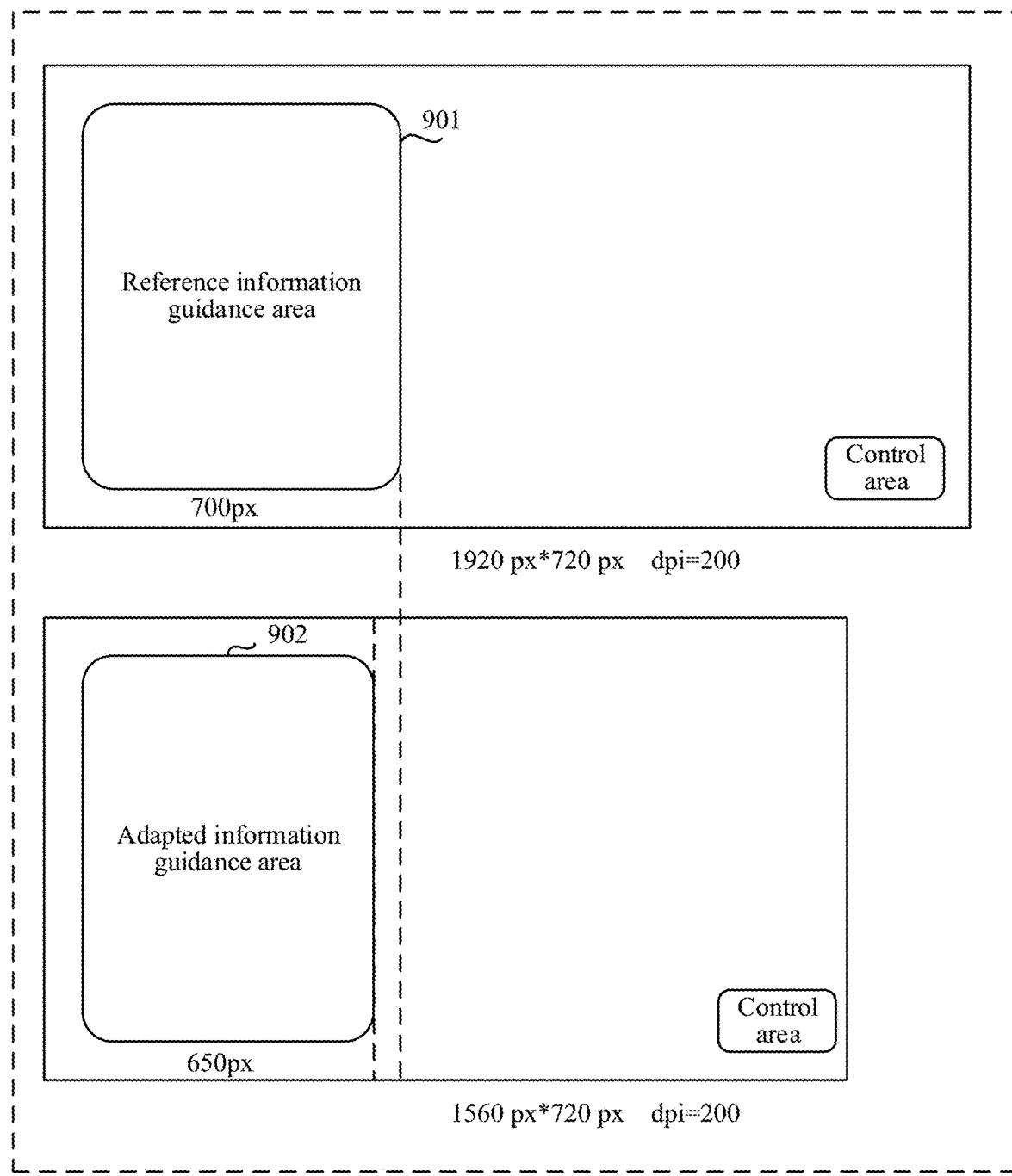
FIG. 9 is still another schematic diagram of a reference application interface and an adapted application interface according to an embodiment of this application.

For example, as shown in FIG. 9, the reference resolution of the reference screen is set to be 1920 px*720 px, the reference dot density of the reference screen to be 200, the reference width range is 480 px to 560 px, and the preset dot density corresponding to the reference width range to be 160.

Since the ratio of the reference dot density of the reference screen to the preset dot density corresponding to the reference width range is 1.25, an adjustment ratio of the reference width range is 1.25. Based on the adjustment ratio, the width adjustment range can be determined to be 600 px to 700 px and the pixel width of the reference information guidance area 901 to be 700 px. The preset selection rule is as follows.

When the screen width is less than 1440 px, the final pixel width of the adapted information guidance area in the adapted application interface is a minimum width MinN of the width adjustment range.

When the screen width is greater than or equal to 1440 px and less than 1660 px, the final pixel width of the adapted information guidance area in the adapted application interface is an average of the minimum width MinN and a maximum width MaxN of the width adjustment range.

When the screen width is greater than or equal to 1660 px, the final pixel width of the adapted information guidance area in the adapted application interface is the maximum width MaxN of the width adjustment range.

The resolution to be adapted of the screen to be adapted is set to be 1560 px*720 px and the dpi of the screen to be adapted to be 200. Since the dot density to be adapted of the screen to be adapted is the same as the reference dot density of the reference screen, the initial pixel size of the adapted information guidance area is the same as the reference pixel size of the reference information guidance area.

Since the width to be adapted of the screen to be adapted is 1560 px, the final pixel width of the adapted information guidance area 902 in the adapted application interface can be determined to be 650 px according to the above selection rule, the initial pixel width of 700 px of the adapted information guidance area 902 is adjusted to the final pixel width of 650 px, and finally the final pixel width is multiplied by the physical width of the unit pixel to obtain the physical width of the adapted information guidance area presented in the adapted application interface.

In some embodiments of this application, left-right width adaptation can be performed on the adapted information guidance area presented in the adapted application interface based on association between the reference width of the reference screen and the width to be adapted of the screen to be adapted, so that a size of the adapted information guidance area is more matched with the adapted application interface, thereby improving the visual presentation effect of the adapted application interface.

In some embodiments, the multiple adapted information guidance areas described above are located at the mainline layer among various service levels of the application to be displayed. A physical width of each adapted information guidance area presented in the adapted application interface is determined in the mainline layer according to the initial pixel size of the adapted information guidance area and the width to be adapted of the screen to be adapted.

The physical height of each adapted information guidance area presented in the adapted application interface and a number of adaptations of the interface elements displayed in each adapted information guidance area are determined in the mainline layer according to the initial pixel size of the adapted information guidance area and the height to be adapted of the screen to be adapted.

In some embodiments, the physical height of each adapted information guidance area presented in the adapted application interface is determined in the following way.

An initial pixel height of the adapted information guidance area is determined based on the initial pixel size. Then, a height adjustment value of the initial pixel height is determined based on the height to be adapted of the screen to be adapted and display state information of the reference information guidance area. The final pixel height of the adapted information guidance area is determined based on the height adjustment value and the initial pixel height, and the physical height of the adapted information guidance area presented in the adapted application interface is determined based on the final pixel height.

In some embodiments, the number of adaptations of the interface elements displayed in each adapted information guidance area are determined in the following way.

A number of element adjustments in the adapted information guidance area is determined based on the height to be adapted and the display state information of the reference information guidance area. Then, a number of adaptations of the interface elements of the adapted information guidance area displayed in the adapted application interface is determined based on the number of element adjustments and a number of references of the interface elements of the reference information guidance area displayed in the reference application interface.

If the display state information of the reference information guidance area indicates that the reference information guidance area does not display all of the interface elements, a corresponding adapted information guidance area can display more interface elements by increasing a display area.

In one embodiment, when an adapted information guidance area with an initial pixel height can be displayed for the height to be adapted of the adapted application interface, and there is an extra blank area available for displaying the adapted information guidance area, then the height adjustment value of the initial pixel height and the number of element adjustments of the adapted information guidance area are determined based on a pixel height of the blank area, and at this time, both the height adjustment value and the number of element adjustments are greater than 0.

When the adapted information guidance area of the initial pixel height can be displayed for the height to be adapted of the adapted application interface and there is no extra blank area available for displaying the blank area of the adapted information guidance area, a height adjustment value of the initial pixel height and the number of element adjustments of the adapted information guidance area are both 0.

When all of adapted information guidance areas of the initial pixel height can't be displayed for the height to be adapted of the adapted application interface, the height adjustment value of the initial pixel height and the number of element adjustments of the adapted information guidance area are determined based on pixel heights that can't be displayed in the adapted information guidance area, and at this time, both the height adjustment value and the number of element adjustments are less than 0.

If the display state of the reference information guidance area indicates that all of the interface elements have been displayed in the reference information guidance area, the height adjustment value of the initial pixel height and the number of element adjustments of the adapted information guidance area are both 0.

The height adjustment value is added to the initial pixel height of the adapted information guidance area to determine the final pixel height of this adapted information guidance area in the adapted application interface, and then the final pixel height of the adapted information guidance area is multiplied with the physical height of the unit pixel to obtain the presented physical height of the adapted information guidance area. The number of element adjustments is added to the number of references of the interface elements of the reference information guidance area displayed in the reference application interface, and a number of adaptations of the interface elements of this information guidance area displayed in the adapted application interface is determined.

Figure 10:
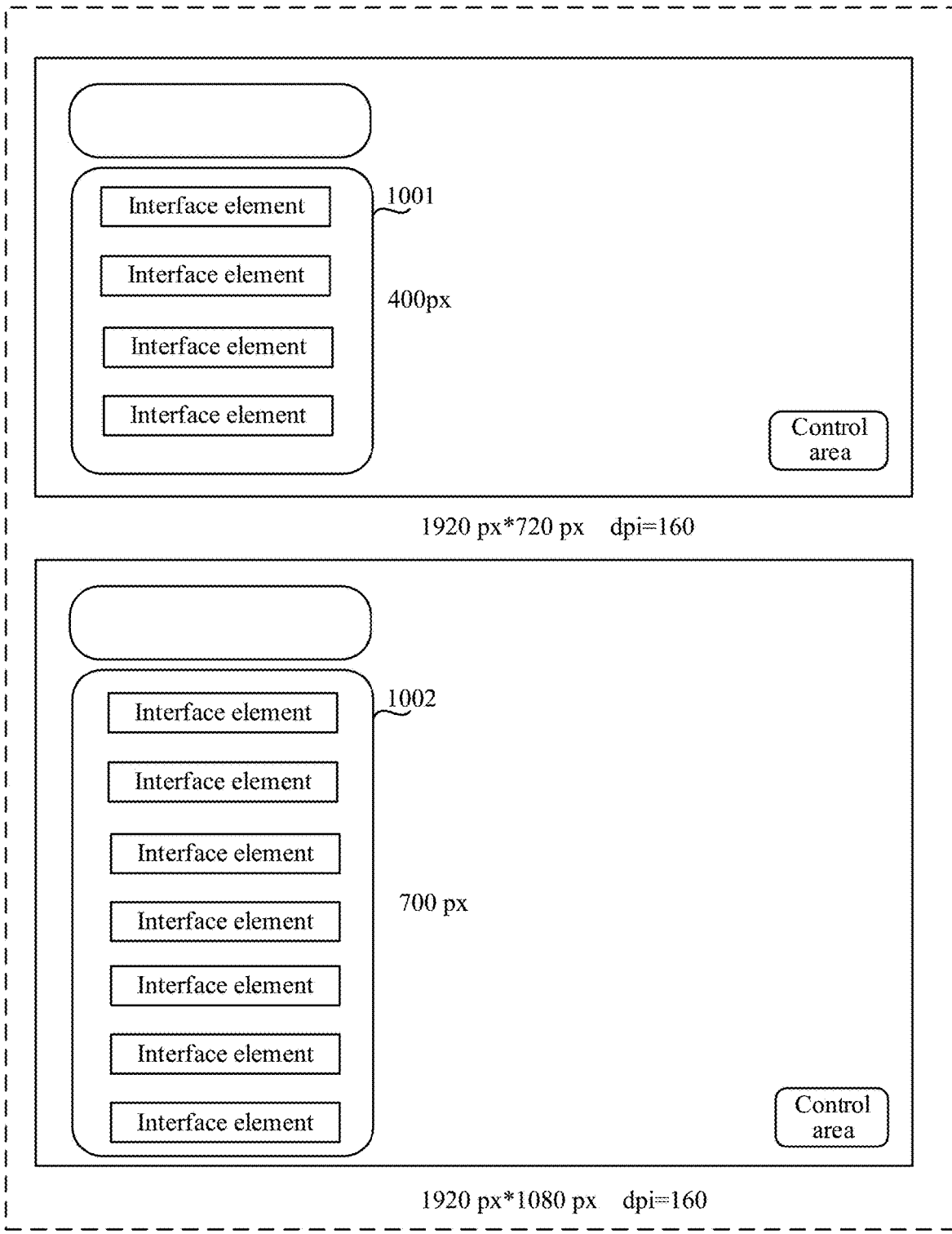
FIG. 10 is still another schematic diagram of a reference application interface and an adapted application interface according to an embodiment of this application.

For example, as shown in FIG. 10, the reference resolution of the reference screen is set to be 1920 px*720 px, the dpi of the reference screen to be 160, a pixel height of the reference information guidance area 1001 is 400 px, and a number of references of interface elements in the reference information guidance area 1001 is 4.

The resolution to be adapted of the screen to be adapted is set to be 1920 px*1080 px, the dpi of the screen to be adapted to be 160. Since the dot density to be adapted is the same as the reference dot density, the initial pixel height of the adapted information guidance area 1002 is the same as a reference pixel height of the reference information guidance area 1001.

Assuming that the display state information of the reference information guidance area 1001 indicates that the reference information guidance area 1001 does not display all of the interface elements, and the adapted information guidance area 1002 with the initial pixel height can be displayed for the height to be adapted of the adapted application interface, and there is an extra blank area available for displaying the adapted information guidance area, then based on a pixel height of the blank area, the height adjustment value of the initial pixel height is determined to be 300 px and the number of element adjustments of the adapted information guidance area to be 3.

The height adjustment value is added to the initial pixel height of the adapted information guidance area 1002 to determine the final pixel height of the adapted information guidance area in the adapted application interface 1002 to be 700 px, and then the final pixel height of the adapted information guidance area is multiplied with the physical height of the unit pixel to obtain the presented physical height of the adapted information guidance area 1002. The number of element adjustments is added to the number of references of the interface elements of the reference information guidance area 1001 displayed in the reference application interface, and a number of adaptations of the interface elements of the adapted information guidance area 1002 displayed in the adapted application interface is determined to be 7. When up-down adaptation is performed and the adapted information guidance area 1002 is displayed, a spacing between the interface elements in the height direction may not change and the information container may vary with the height to increase displayed content.

In some embodiments of this application, based on the height to be adapted of the screen to be adapted and the display state information in the reference information guidance area, up-down height adaptation is performed on the adapted information guidance area presented in the adapted application interface, so that a number of interface elements displayed in the adapted information guidance area can be accordingly adjusted according to the height to be adapted of the screen to be adapted, and thus a space of the adapted application interface can be fully utilized, which not only avoids space waste, but also ensures the visual presentation effect of the application interface.

In one embodiment, the adapted application interface further includes an adapted control area for displaying interface elements associated with operation controls, and the multiple adapted information guidance areas include an adapted dynamic information guidance area. A final display position of the adapted control area in the adapted application interface is determined based on a pixel size of the blank area, and the blank area is a blank area between a lower boundary of the adapted dynamic information guidance area and a lower boundary of the adapted application interface.

In one embodiment, the initial pixel size of the adapted control area can be determined based on a reference virtual pixel size of a reference control area and the dot density to be adapted of the screen to be adapted. Generally, the initial pixel size of the adapted control area can directly serve as the adapted pixel size of the adapted control area for displaying, or the adapted pixel size of the adapted control area can be determined in a similar way to that of determining the adapted pixel size of the adapted information guidance area. The physical size of the adapted control area presented in the adapted application interface is determined based on the initial pixel size of the adapted control area and the physical size of the unit pixel.

In some embodiments, the adapted control area is located in the control layer among various service levels of the application to be displayed, and the final display position of the adapted control area in the adapted application interface is in the control layer and determined based on the pixel size of the blank area between the lower boundary of the adapted dynamic information guidance area and the lower boundary of the adapted application interface.

In the reference application interface, the reference dynamic information guidance area is generally displayed at the leftmost side, and the reference control area is generally displayed on a right side of the reference dynamic information guidance area. However, in a vehicle application scenario, the left side of the reference application interface is proximate to a driver, which is a golden area for operation and display. Therefore, in a process of interface adaptation, if there is still a blank area on the left side of the adapted application interface after displaying the adapted dynamic information guidance area, the adapted control area can be moved below the adapted dynamic information guidance area for displaying, which can make good use of the golden area in the adapted application interface and facilitate the driver's operations.

In view of this, in some embodiments of this application, if the pixel size of the blank area is greater than a preset threshold, the blank area is taken as the final display position of the adapted control area in the adapted application interface. If the pixel size of the blank area is less than or equal to the preset threshold, the final display position of the adapted control area in the adapted application interface is determined based on a display position relationship between the reference dynamic information guidance area and the reference control area in the reference application interface and the display position of the adapted dynamic information guidance area in the adapted application interface.

In one embodiment, when the pixel size of the blank area is larger than the preset threshold, it indicates that the blank area between the lower boundary of the adapted dynamic information guidance area and the lower boundary of the adapted application interface can also display the adapted control area, and thus this blank area is taken as the final display position of the adapted control area in the adapted application interface.

If the pixel size of the blank area is less than or equal to the preset threshold, it indicates that the blank area between the lower boundary of the adapted dynamic information guidance area and the lower boundary of the adapted application interface cannot display the adapted control area, then a display position relationship between the adapted dynamic information guidance area and the adapted control area in the adapted application interface is determined based on the display position relationship between the reference dynamic information guidance area and the reference control area in the reference application interface, and then the final display position of the adapted control area in the adapted application interface is determined based on the display position relationship between the adapted dynamic information guidance area and the adapted control area in the adapted application interface and the display position of the adapted dynamic information guidance area in the adapted application interface.

Figure 11:
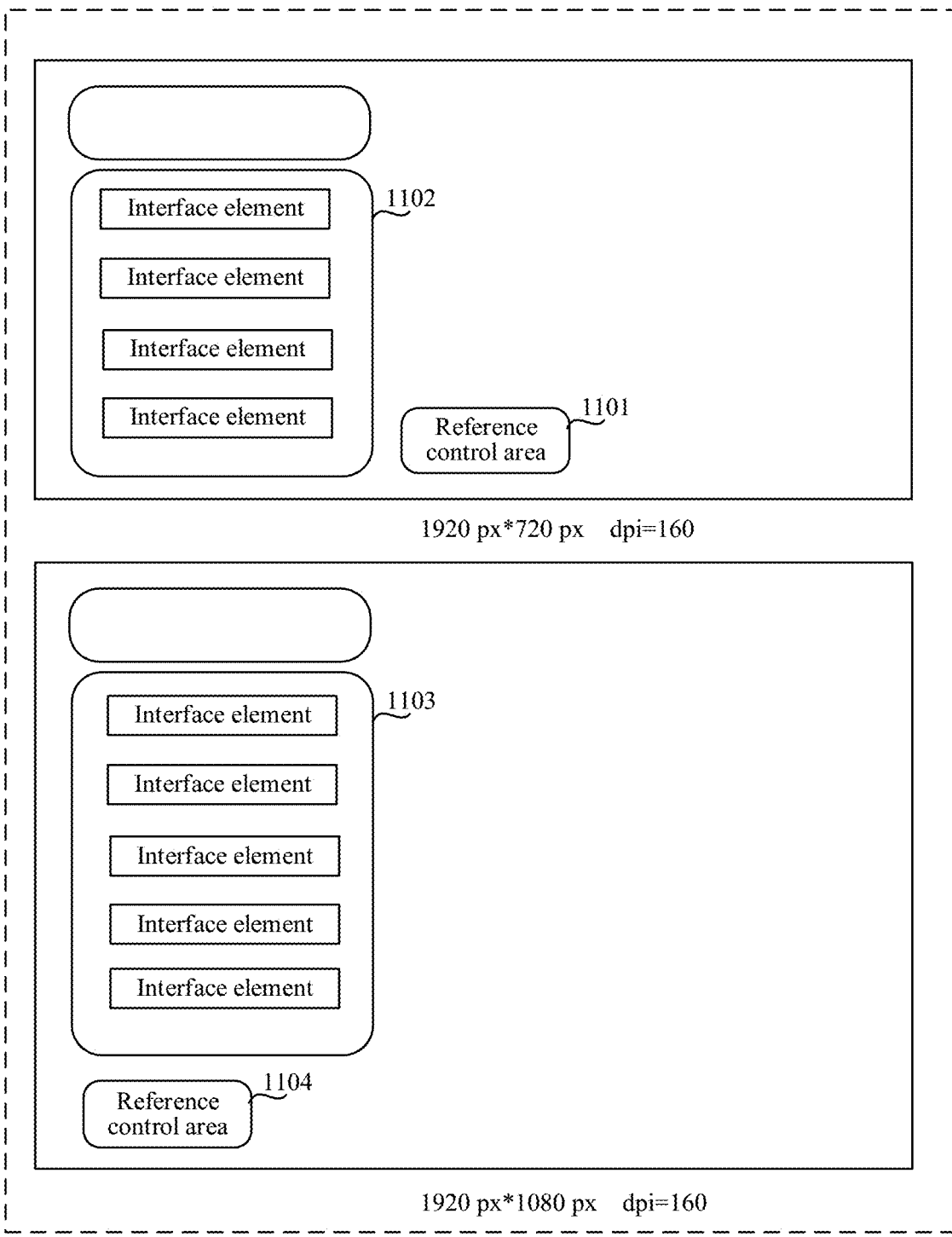
FIG. 11 is still another schematic diagram of a reference application interface and an adapted application interface according to an embodiment of this application.

For example, as shown in FIG. 11, the reference resolution of the reference screen is set to 1920 px*720 px, the dpi of the reference screen is 160, and the reference control area 1101 is located in a lower right corner of the reference dynamic information guidance area 1102. The resolution to be adapted of the screen to be adapted is 1920 px*1080 px, and the dpi of the screen to be adapted is 160.

Assuming that after the screen to be adapted shows all of contents of a adapted dynamic information guidance area 1103 corresponding to the reference dynamic information guidance area 1102, there is the blank area between the lower boundary of the adapted dynamic information guidance area 1103 and the lower boundary of the adapted application interface, and the pixel size of the blank area is greater than the preset threshold, then the adapted control area 1104 is displayed below the adapted dynamic information guidance area 1103.

It is to be understood that, If the pixel size of the blank area between the lower boundary of the adapted dynamic information guidance area 1103 and the lower boundary of the adapted application interface is less than or equal to the preset threshold, the adapted control area 1104 is displayed in a lower right corner of the adapted dynamic information guidance area 1103.

In some embodiments of this application, based on a situation of the adapted application interface displaying the adapted information guidance area, the display position of the adapted control area in the adapted application interface is dynamically adjusted, and control of interface details is increased in terms of individual differences of the screen, so that the space of the application interface is more reasonably utilized, and convenience of operation is also improved.

Figure 12:
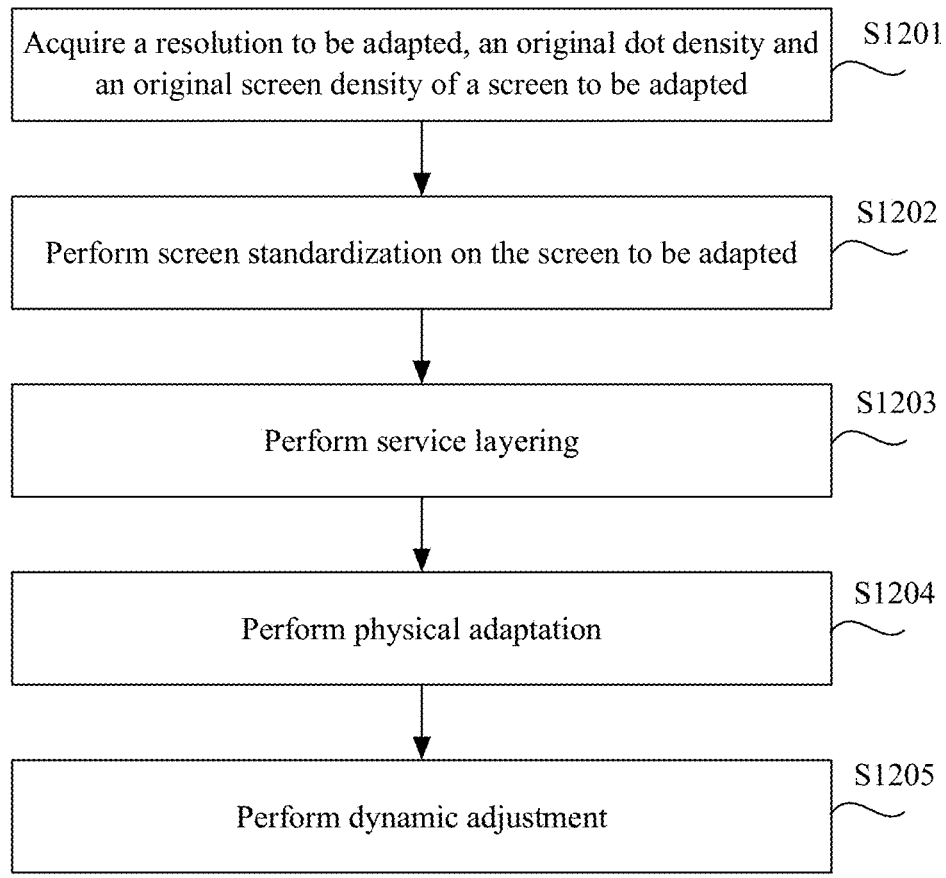
FIG. 12 is a schematic flowchart of a method for adapting an application interface according to an embodiment of this application.

In order to better illustrate some embodiments of this application, a method for adapting an application interface according to some embodiments of this application is described below in combination with specific implementation scenarios. A flow of this method can be executed by terminal device 101 shown in FIG. 1, or executed by the server 102, or interactively executed by the terminal device 101 and the server 102. The method includes following steps, as shown in FIG. 12:

S1201: Acquire a resolution to be adapted, an original dot density and an original screen density of a screen to be adapted.

S1202: Perform screen standardization on the screen to be adapted.

Specifically, an effective width and effective height of the screen to be adapted are determined based on the resolution to be adapted of the screen to be adapted and the original screen density of the screen to be adapted. A ratio of the effective width to the reference width is taken as the first difference degree. A ratio of the effective height to the reference height is taken as the second difference degree.

If both the first difference degree and the second difference degree is greater than 1, there is no need to perform screen standardization on the screen to be adapted, and the original dot density of the screen to be adapted is directly taken as the dot density to be adapted. If the first difference degree or the second difference degree is less than 1, screen standardization is required for the screen to be adapted. A process of screen standardization for the screen to be adapted is as follows:

If the first difference degree is greater than the second difference degree, the height direction is taken as the standardization direction of the screen to be adapted. If the first difference degree is less than or equal to the second difference degree, the width direction is taken as the standardization direction of the screen to be adapted. A number of pixels to be adapted corresponding to the screen to be adapted in the standardization direction is determined based on the resolution to be adapted of the screen to be adapted. A ratio of the number of the pixels to be adapted to the number of reference pixels of the reference screen in the standardization direction is taken as the screen to be adapted density. Then a product of the screen to be adapted density and the reference dot density of the reference screen is taken as the dot density to be adapted.

S1203: Perform service layering.

Specifically, the application to be displayed is divided into a plurality of service levels, the plurality of independent service levels include a notification layer, a branch layer, a mainline layer, a control layer and a base map layer, and each service level bears a different service function, with jumping logic and public relations among the service levels being preset.

S1204: Perform physical adaptation.

For the interface elements in the application interface, the reference virtual pixel size of the interface element can be taken as the adapted virtual pixel size of the interface element in the adapted application interface, and then the adapted pixel size of the interface element in the adapted application interface can be determined based on the adapted virtual pixel size of the interface element and the dot density to be adapted of the screen to be adapted. The physical size of the interface element presented in the adapted application interface is determined based on the adapted pixel size of the interface element and the physical size of the unit pixel in the screen to be adapted. At this time, the physical size of the interface element presented in the adapted application interface is the same as the physical size of the interface element presented in the reference application interface.

In one embodiment, for the functional area in the application interface, the functional area refers to an information container bearing interface elements in the application interface, and one functional area includes one or more interface elements, and the functional area can be an information guidance area, a control area or the like. Taking the information guidance area for detailed description, the reference virtual pixel size of the reference information guidance area is taken as an adapted virtual pixel size of a corresponding adapted information guidance area in the adapted application interface, and then the initial pixel size of the adapted information guidance area in the adapted application interface is determined based on the adapted virtual pixel size of the adapted information guidance area and the dot density to be adapted of the screen to be adapted. A method of physical adaptation for other functional areas is the same as the method of physical adaptation for the information guidance area, which is not repeatedly described here again.

S1205: Perform dynamic adjustment.

After the initial pixel size of the adapted functional area is obtained through the physical adaptation, and the initial pixel size of the adapted functional area need to be dynamically adjusted to obtain the adapted pixel size of the adapted functional area, and the adapted functional area includes the adapted information guidance area and the adapted control area.

Taking the adapted information guidance area for detailed description, the initial pixel width and the initial pixel height of the adapted information guidance area are determined based on the initial pixel size. A width adjustment range of the adapted information guidance area is determined based on the reference width of the reference screen, the reference dot density of the reference screen and the dot density to be adapted of the screen to be adapted. Then, the initial pixel width is adjusted based on the width to be adapted and the width adjustment range of the screen to be adapted to obtain the final pixel width of the adapted information guidance area. Then, the height adjustment value of the initial pixel height and the number of element adjustments of the adapted information guidance area are determined based on the height to be adapted of the screen to be adapted and the display state information of the reference information guidance area. The final pixel height of the adapted information guidance area is determined based on the height adjustment value and the initial pixel height. Then, the adapted pixel size of the adapted information guidance area is obtained based on the final pixel width and the final pixel height of the adapted information guidance area.

The physical size of the adapted information guidance area presented in the adapted application interface is determined based on the adapted pixel size of the adapted information guidance area and the physical size of the unit pixel in the screen to be adapted. At this time, because the adapted pixel size of the adapted information guidance area and the initial pixel size of the adapted information guidance area may be different, the physical size of the adapted information guidance area presented in the adapted application interface may also be different from the physical size of the adapted information guidance area presented in the reference application interface.

It is to be understood that, in dynamically adjusting the adapted information guidance area, only the pixel size of the adapted information guidance area, an information container, is adjusted, but the pixel size of the interface element in the adapted information guidance area is not adjusted. In addition, since the adapted information guidance area is located in the mainline layer 403 among various service levels shown in FIG. 4, in dynamically adjusting the adapted information guidance area, it is only necessary to adjust the adapted information guidance area in the mainline layer 403 without adjusting other service layers.

In addition, when adjusting the initial pixel height of the adapted information guidance area, the number of element adjustments of the adapted information guidance area is determined based on the height to be adapted of the screen to be adapted and the display state information of the reference information guidance area. Then, the number of adaptations of the interface elements of the adapted information guidance area displayed in the adapted application interface is determined based on the number of element adjustments and the number of references of the interface elements of the reference information guidance area displayed in the reference application interface, and interface elements of the number of adaptations are displayed in the adapted information guidance area.

For the adapted control area, after determining the adapted pixel size of the adapted control area in the same way as determining the adapted pixel size of the adapted information guidance area as described above, if a pixel size of a blank area between a lower boundary of the adapted dynamic information guidance area at a leftmost side of the screen to be adapted and a lower boundary of the adapted application interface is greater than the preset threshold, the adapted control area is displayed below the adapted dynamic information guidance area.

In dynamically adjusting the adapted control area, only the pixel size of the adapted control area, an information container, is adjusted, but the pixel size of the interface element in the adapted control area is not adjusted. Since the adapted control area is located in the control layer 403 among various service levels shown in FIG. 4, in dynamically adjusting the adapted control area, it is only necessary to adjust the adapted control area in the control layer 403 without adjusting other service layers.

In some embodiments of this application, with a reference of the reference virtual pixel size of the interface element being equal to the adapted virtual pixel size of the interface element, the first physical size of the interface element in the adapted application interface is determined by combining a relationship among the virtual pixel size, a pixel size and a dot density of the interface element, to ensure that a first physical size of each interface element in the adapted application interface presented in the adapted application interface is the same as a second physical size of a corresponding interface element correspondingly presented in the reference application interface, so that visual presentation effect of respective interface elements in the adapted application interface displayed on the screen to be adapted is the same as that of corresponding respective interface elements in the reference application interface displayed on the reference screen, and also to ensure that visual presentation effect of interface elements in the adapted application interface presented on different terminal devices is the same, thereby improving use experience of the object. Secondly, by standardizing the screen to be adapted, a set of reference application interfaces can meet adaptation requirements of different screens such as those in cars, tablets and mobile phones, and avoid resource waste caused by repeated design of the reference application interfaces. In addition, after the physical adaptation of the functional area in the application interface, the functional area is further dynamically adjusted (including left-right adaptation and up-down adaptation), and display positions of some functional areas in the application interface are adjusted, which increases control of details and makes more reasonable use of space of the application interface.

Figure 13:
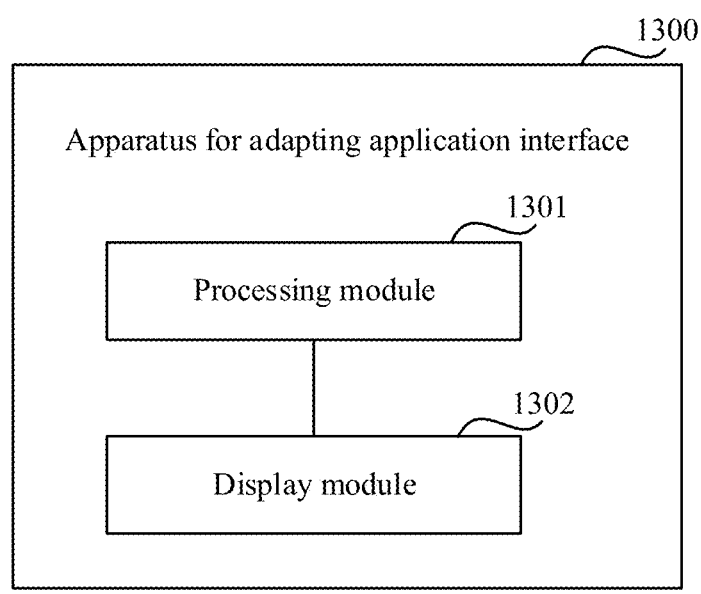
FIG. 13 is a schematic structural diagram of an apparatus for adapting an application interface according to an embodiment of this application.

Based on the same technical concept, an apparatus for adapting an application interface is provided in an embodiment of this application. As shown in FIG. 13, the apparatus 1300 includes:

a processing module 1301, configured to acquire a trigger operation for an application to be displayed on a screen to be adapted; and a display module 1302, configured to display an adapted application interface of the application to be displayed through the screen to be adapted in response to the trigger operation, the adapted application interface including a plurality of interface elements, and for each of the plurality of interface elements, a first physical size of the interface element presented in the adapted application interface being the same as a second physical size presented in a reference application interface; and the first physical size of the interface element being determined based on an adapted virtual pixel size of the interface element in the adapted application interface and a dot density to be adapted of the screen to be adapted, and the adapted virtual pixel size being the same as a reference virtual pixel size of the interface element in the reference application interface.

In one embodiment, the processing module 1301 is further configured to:

determine an adapted pixel size of the interface element in the adapted application interface based on the adapted virtual pixel size of the interface element and the dot density to be adapted; and determine the first physical size of the interface element presented in the adapted application interface based on the adapted pixel size of the interface element.

In one embodiment, the processing module 1301 is further configured to:

determine an effective width and effective height of the screen to be adapted based on the resolution to be adapted of the screen to be adapted and an original screen density of the screen to be adapted;

determine a standardization direction of the screen to be adapted based on a first difference degree between the effective width and a reference width of the reference screen and a second difference degree between the effective height and a reference height of the reference screen; and adjust an original pixel density of the screen to be adapted to obtain the dot density to be adapted based on the standardization direction.

In one embodiment, the processing module 1301 is further configured to:

determine the first difference degree based on a ratio of the effective width to the reference width before determining a standardization direction of the screen to be adapted based on a first difference degree between the effective width and a reference width of the reference screen and a second difference degree between the effective height and a reference height of the reference screen; determine a second difference degree based on a ratio of the effective height to the reference height; and determine that the first difference degree or the second difference degree is less than 1.

In one embodiment, the processing module 1301 is further configured to:

take the height direction as the standardization direction of the screen to be adapted if the first difference degree is greater than the second difference degree; and take the width direction as the standardization direction of the screen to be adapted if the first difference degree is less than or equal to the second difference degree.

In one embodiment, the processing module 1301 is further configured to:
  determine a number of pixels to be adapted corresponding to the screen to be adapted in the standardization direction based on the resolution to be adapted;
  adjust the original screen density to obtain a screen to be adapted density based on the number of pixels to be adapted and a number of reference pixels corresponding to the reference screen in the standardization direction; and
  adjust the original pixel density to determine the dot density to be adapted based on the screen to be adapted density and the reference dot density of the reference screen.

In one embodiment, the adapted application interface further includes multiple adapted information guidance areas, and each of the adapted information guidance areas is used to display interface elements associated with a type of guidance information;
  for each of the adapted information guidance areas, a physical width of the adapted information guidance area presented in the adapted application interface is determined according to an initial pixel size of the adapted information guidance area and the width to be adapted of the screen to be adapted, the initial pixel size of the adapted information guidance area is determined based on a reference virtual pixel size of a corresponding reference information guidance area in the reference application interface and the dot density to be adapted; and
  physical heights of the adapted information guidance areas presented in the adapted application interface and a number of adaptations of the interface elements displayed in the adapted information guidance areas are determined according to the initial pixel size of the adapted information guidance area and the height to be adapted of the screen to be adapted.

In one embodiment, the processing module 1301 is further configured to:
  determine a width adjustment range of the adapted information guidance area based on a reference width range and the reference dot density of the reference screen;
  determine an initial pixel width of the adapted information guidance area based on the initial pixel size; and
  adjust the initial pixel width to obtain a final pixel width of the adapted information guidance area based on the width to be adapted and the width adjustment range of the screen to be adapted, and determine the physical width of the adapted information guidance area presented in the adapted application interface based on the final pixel width.

In one embodiment, the processing module 1301 is further configured to:
  take a ratio of the preset dot density corresponding to the reference width range to the reference dot density of the reference screen as an adjustment ratio of the reference width range; and
  multiply upper and lower boundary values of the reference width range respectively by the adjustment ratio to obtain the width adjustment range of the adapted information guidance area.

In one embodiment, the processing module 1301 is further configured to:
  determine an initial pixel height of the adapted information guidance area based on the initial pixel size;
  determine a height adjustment value of the initial pixel height based on the height to be adapted and the display state information of the reference information guidance area; and
  determine the final pixel height of the adapted information guidance area based on the height adjustment value and the initial pixel height, and determine the physical height of the adapted information guidance area presented in the adapted application interface based on the final pixel height.

In one embodiment, the processing module 1301 is further configured to:
  determine a number of element adjustments in the adapted information guidance area based on the height to be adapted and the display state information of the reference information guidance area; and
  determine a number of adaptations of the interface elements of the adapted information guidance area displayed in the adapted application interface based on the number of element adjustments and a number of references of the interface elements of the reference information guidance area displayed in the reference application interface.

In one embodiment, the adapted application interface further includes an adapted control area for displaying interface elements associated with operation controls, and the multiple adapted information guidance areas include an adapted dynamic information guidance area; and
  a final display position of the adapted control area in the adapted application interface is determined based on a pixel size of the blank area, and the blank area is a blank area between a lower boundary of the adapted dynamic information guidance area and a lower boundary of the adapted application interface.

In one embodiment, the processing module 1301 is further configured to:
  take the blank area as the final display position of the adapted control area in the adapted application interface if the pixel size of the blank area is greater than a preset threshold;
  determine the final display position of the adapted control area in the adapted application interface based on a display position relationship between the reference dynamic information guidance area and the reference control area in the reference application interface and a display position of the adapted dynamic information guidance area in the adapted application interface, if the pixel size of the blank area is less than or equal to the preset threshold.

In one embodiment, the application to be displayed includes a plurality of independent service levels, and the plurality of independent service levels include a notification layer, a branch layer, a mainline layer, a control layer and a base map layer.

In one embodiment, the multiple adapted information guidance areas are located at the mainline layer;
  a physical width of each adapted information guidance area presented in the adapted application interface is determined in the mainline layer according to the initial pixel size of the adapted information guidance area and the width to be adapted of the screen to be adapted; and
  the physical height of each adapted information guidance area presented in the adapted application interface and a number of adaptations of the interface elements displayed in each adapted information guidance area are determined in the mainline layer according to the initial pixel size of the adapted information guidance area and the height to be adapted of the screen to be adapted.

In one embodiment, the adapted control area is located at the control layer;

the final display position of the adapted control area in the adapted application interface is determined in the control layer based on the pixel size of the blank area, and the blank area is a blank area between the lower boundary of the adapted dynamic information guidance area and the lower boundary of the adapted application interface.

In some embodiments of this application, with a reference of the reference virtual pixel size of the interface element being equal to the adapted virtual pixel size of the interface element, the first physical size of the interface element in the adapted application interface is determined by combining a relationship among the virtual pixel size, a pixel size and a dot density of the interface element, to ensure that a first physical size of each interface element in the adapted application interface presented in the adapted application interface is the same as a second physical size of a corresponding interface element correspondingly presented in the reference application interface, so that visual presentation effect of respective interface elements in the adapted application interface displayed on the screen to be adapted is the same as that of corresponding respective interface elements in the reference application interface displayed on the reference screen, and also to ensure that visual presentation effect of interface elements in the adapted application interface presented on different terminal devices is the same, thereby improving use experience of the object.

Figure 14:
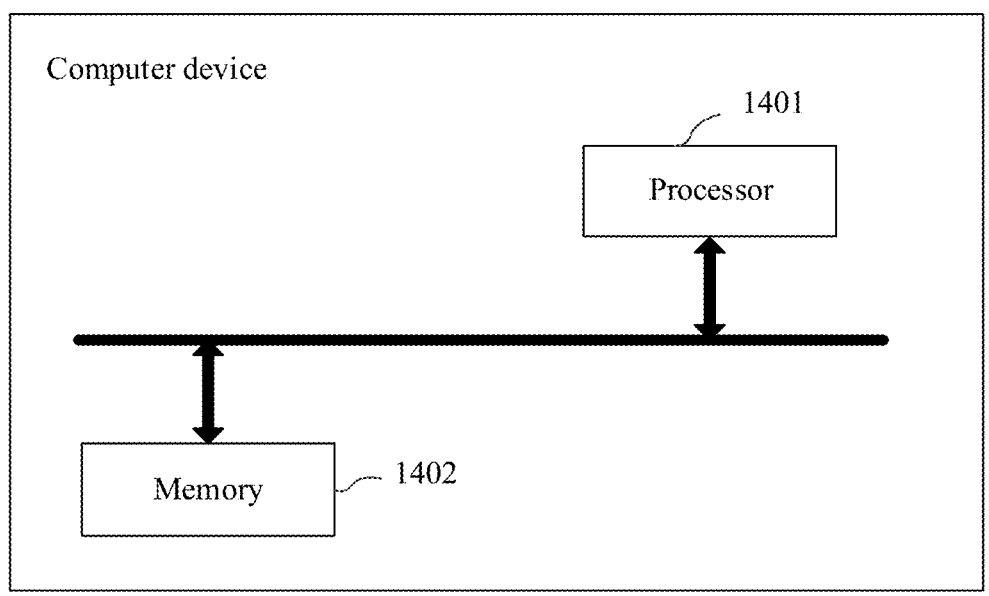
FIG. 14 is a schematic structural diagram of a computer device according to an embodiment of this application.

Based on the same technical concept, a computer device is provided in an embodiment of this application, which can be the terminal device and/or the server as shown in FIG. 1, and as shown in FIG. 14, includes at least one processor 1401 and a memory 1402 connected with the at least one processor. A specific connection medium between the processor 1401 and the memory 1402 is not limited in some embodiments of this application, and a bus connection between the processor 1401 and the memory 1402 is taken as an example in FIG. 14. The bus may be classified as an address bus, a data bus, a control bus, or the like.

In some embodiments of this application, the memory 1402 stores instructions that can be executed by the at least one processor 1401, and the at least one processor 1401 can execute the steps of the method for adapting the application interface by executing the instructions stored in the memory 1402.

The processor 1401 is a control center of computer device, which can connect various parts of computer device with various interfaces and lines, and realize application interface adaptation by running or executing instructions stored in the memory 1402 and calling data stored in memory 1402. In some embodiments, processor 1401 may include one or more processing units. The processor 1401 may integrate an application processor and a modem processor. The application processor mainly processes an operating system, a user interface, an application program, and the like. The modem processor mainly processes wireless communication. It is to be understood that the modem described above may either not be integrated into the processor 1401. In some embodiments, the processor 1401 and the memory 1402 can be implemented on the same chip, and in some embodiments, they can also be implemented separately on independent chips.

The processor 1401 may be a general-purpose processor, such as a central processing unit (CPU), a digital signal processor, an application specific integrated circuit (ASIC), a field programmable gate array or other programmable logic device, a discrete gate or transistor logic device, and a discrete hardware component, and may implement or execute the methods, steps and logic block diagrams disclosed in some embodiments of this application. The general-purpose processor may be a microprocessor or any conventional processor, or the like. The steps of the methods disclosed with reference to some embodiments of this application may be directly performed and completed by a hardware processor, or may be performed and completed by using a combination of hardware and software modules in the processor.

As a nonvolatile computer-readable storage medium, memory 1402 can be used to store nonvolatile software programs, nonvolatile computer-executable programs and modules. The memory 1402 may include at least one type of storage media, and for example may include a flash memory, a hard disk, a multimedia card, a card memory, a Random Access Memory (RAM), a Static Random Access Memory (SRAM), a Programmable Read Only Memory (PROM), a Read Only Memory (ROM), an electrically erasable programmable read-only memory (EEPROM), a magnetic memory, a magnetic disk, an optical disk and so on. Memory 1402 is any other medium that can be used to carry or store desired program codes in the form of instructions or data structures and can be accessed by the computer devices, but is not limited thereto. The memory 1402 in some embodiments of this application can also be a circuit or any other device that can realize the storage function, and is used for storing program instructions and/or data.

Based on the same inventive concept, a computer-readable storage medium is provided in an embodiment of this application with a computer program executable by a computer device stored, which, when executed on the computer device, causes the computer device to execute steps of the method for adapting the application interface described above.

Based on the same inventive concept, a computer program product is provided in some embodiments of this application, which includes a computer program stored on a computer-readable storage medium, and the computer program includes program instructions, which, when executed by a computer device, cause the computer device to perform steps of the method for adapting the application interface described above.

A person skilled in the art can understand that some embodiments of this application may be provided as a method, or a computer program product. Therefore, this application may use a form of hardware-only embodiments, software-only embodiments, or embodiments combining software and hardware. Moreover, this application may use a form of a computer program product that is implemented on one or more computer-usable storage media (including but not limited to a disk memory, a CD-ROM, an optical memory, and the like) that include computer-usable program code.

This application is described with reference to flowcharts and/or block diagrams of the method, the device (system), and the computer program product according to some embodiments of this application. It is to be understood that computer program instructions can implement each procedure and/or block in the flowcharts and/or block diagrams and a combination of procedures and/or blocks in the flowcharts and/or block diagrams. These computer program instructions may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by the computer or the processor of another programmable data processing device.

These computer program instructions may alternatively be stored in a computer-readable memory that can instruct a computer or another programmable data processing device to operate in a specific manner, so that the instructions stored in the computer-readable memory generate an artifact that includes an instruction apparatus. The instruction apparatus implements a specific function in one or more procedures in the flowcharts and/or in one or more blocks in the block diagrams.

These computer program instructions may further be loaded onto a computer or another programmable data processing device, so that a series of operations and steps are performed on the computer or other programmable device, thereby generating computer-implemented processing. Therefore, the instructions executed on the computer or other programmable device provide steps for implementing a specific function in one or more procedures in the flowcharts and/or in one or more blocks in the block diagrams.

Although some embodiments of this application have been described, once a person skilled in the art knows the basic creative concept, they can make additional changes and modifications to these embodiments. Therefore, the following claims are intended to be construed as to cover the embodiments and all changes and modifications falling within the scope of this application.

Obviously, a person skilled in the art can make various modifications and variations to this application without departing from the spirit and scope of this application. In this case, if the modifications and variations made to this application fall within the scope of the claims of this application and their equivalent technologies, this application is intended to include these modifications and variations.

What is claimed is:

1. A method for adapting an application interface performed by a computer device, comprising:
   receiving a trigger operation for an application to be displayed on a screen; and
   displaying an adapted application interface of the application on the screen in response to the trigger operation, the adapted application interface comprising a plurality of interface elements, and for an interface element of the plurality of interface elements, a first physical size of the interface element presented in the adapted application interface being the same as a second physical size presented in a reference application interface; and
   the first physical size of the interface element being determined based on an adapted virtual pixel size of the interface element in the adapted application interface and a dot density to be adapted, and the adapted virtual pixel size being the same as a reference virtual pixel size of the interface element in the reference application interface,
   wherein the dot density to be adapted is determined as follows:
   determining an effective width and effective height of the screen based on the resolution to be adapted of the screen and an original screen density of the screen;
   determining a standardization direction of the screen based on a first difference degree between the effective width and a reference width of the reference screen and a second difference degree between the effective height and a reference height of the reference screen; and
   adjusting an original pixel density of the screen to obtain the dot density to be adapted based on the standardization direction.

2. The method according to claim 1, wherein the first physical size of the interface element presented in the adapted application interface is determined as follows:
   determining an adapted pixel size of the interface element in the adapted application interface based on the adapted virtual pixel size of the interface element and the dot density to be adapted; and
   determining the first physical size of the interface element presented in the adapted application interface based on the adapted pixel size of the interface element.

3. The method according to claim 1, further comprising:
   determining the first difference degree based on a ratio of the effective width to the reference width; determining a second difference degree based on a ratio of the effective height to the reference height; and
   determining that the first difference degree or the second difference degree is less than 1.

4. The method according to claim 3, wherein the determining the standardization direction of the screen based on the first difference degree between the effective width and the reference width of the reference screen and the second difference degree between the effective height and the reference height of the reference screen comprises:
   taking the height direction as the standardization direction of the screen to be adapted in response to that the first difference degree is greater than the second difference degree; and
   taking the width direction as the standardization direction of the screen to be adapted in response to that the first difference degree is less than or equal to the second difference degree.

5. The method according to claim 1, wherein the adjusting the original pixel density of the screen to obtain the dot density to be adapted based on the standardization direction comprises:
   determining a number of pixels to be adapted corresponding to the screen in the standardization direction based on the resolution to be adapted;
   adjusting the original screen density to obtain a screen density to be adapted based on the number of pixels to be adapted and a number of reference pixels corresponding to the reference screen in the standardization direction; and
   adjusting the original pixel density to determine the dot density to be adapted based on the screen density to be adapted and the reference dot density of the reference screen.

6. The method according to claim 1, wherein the adapted application interface further comprises multiple adapted information guidance areas, and each of the adapted information guidance areas displays interface elements associated with a type of guidance information;
   for each of the adapted information guidance areas, a physical width of the adapted information guidance area presented in the adapted application interface is determined according to an initial pixel size of the adapted information guidance area and the width to be adapted of the screen to be adapted, the initial pixel size of the adapted information guidance area is determined based on a reference virtual pixel size of a corresponding reference information guidance area in the reference application interface and the dot density to be adapted; and physical heights of the adapted information guidance areas presented in the adapted application interface and a number of adaptations of the interface elements displayed in the adapted information guidance areas are determined according to the initial pixel size of the adapted information guidance area and the height to be adapted of the screen to be adapted.

7. The method according to claim 6, wherein the physical width of the adapted information guidance area presented in the adapted application interface is determined as follows:

determining a width adjustment range of the adapted information guidance area based on a reference width range and the reference dot density of the reference screen;

determining an initial pixel width of the adapted information guidance area based on the initial pixel size; and adjusting the initial pixel width to obtain a final pixel width of the adapted information guidance area based on the width to be adapted and the width adjustment range of the screen, and determine the physical width of the adapted information guidance area presented in the adapted application interface based on the final pixel width.

8. The method according to claim 7, wherein the determining the width adjustment range of the adapted information guidance area based on the reference width range and the reference dot density of the reference screen comprises:

taking a ratio of the preset dot density corresponding to the reference width range to the reference dot density of the reference screen as an adjustment ratio of the reference width range; and multiplying upper and lower boundary values of the reference width range respectively by the adjustment ratio to obtain the width adjustment range of the adapted information guidance area.

9. The method according to claim 6, wherein the physical height of each adapted information guidance area presented in the adapted application interface is determined as follows:

determine an initial pixel height of the adapted information guidance area based on the initial pixel size;

determining a height adjustment value of the initial pixel height based on the height to be adapted and the display state information of the reference information guidance area; and determining the final pixel height of the adapted information guidance area based on the height adjustment value and the initial pixel height, and determine the physical height of the adapted information guidance area presented in the adapted application interface based on the final pixel height.

10. The method according to claim 6, wherein the number of adaptations of the interface elements displayed in each adapted information guidance area are determined as follows:

determining a number of element adjustments in the adapted information guidance area based on the height to be adapted and the display state information of the reference information guidance area; and determining a number of adaptations of the interface elements of the adapted information guidance area displayed in the adapted application interface based on the number of element adjustments and a number of references of the interface elements of the reference information guidance area displayed in the reference application interface.

11. The method according to claim 6, wherein the adapted application interface further comprises an adapted control area for displaying interface elements associated with operation controls, and the multiple adapted information guidance areas comprise an adapted dynamic information guidance area; and a final display position of the adapted control area in the adapted application interface is determined based on a pixel size of the blank area, and the blank area is a blank area between a lower boundary of the adapted dynamic information guidance area and a lower boundary of the adapted application interface.

12. The method according to claim 11, wherein the final display position of the adapted control area in the adapted application interface is determined as follows:

taking the blank area as the final display position of the adapted control area in the adapted application interface in response to that the pixel size of the blank area is greater than a preset threshold;

determining the final display position based on a display position relationship between the reference dynamic information guidance area and the reference control area in the reference application interface and a display position of the adapted dynamic information guidance area in the adapted application interface, in response to that the pixel size of the blank area is less than or equal to the preset threshold.

13. The method according to claim 6, wherein the application to be displayed comprises a plurality of independent service levels, and the plurality of independent service levels comprise a notification layer, a branch layer, a mainline layer, a control layer and a base map layer.

14. The method according to claim 13, wherein the multiple adapted information guidance areas are located at the mainline layer;

a physical width of each adapted information guidance area presented in the adapted application interface is determined in the mainline layer according to the initial pixel size of the adapted information guidance area and the width to be adapted; and the physical height of each adapted information guidance area presented in the adapted application interface and a number of adaptations of the interface elements displayed in each adapted information guidance area are determined in the mainline layer according to the initial pixel size of the adapted information guidance area and the height to be adapted.

15. The method according to claim 13, wherein the adapted control area is located at the control layer;

the final display position of the adapted control area in the adapted application interface is determined in the control layer based on the pixel size of the blank area, and the blank area is a blank area between the lower boundary of the adapted dynamic information guidance area and the lower boundary of the adapted application interface.

16. A computer device, comprising a memory, a processor, and a computer program stored in the memory and that can be run in the processor, and the processor being configured to implement:

acquiring a trigger operation for an application to be displayed on a screen; and displaying an adapted application interface of the application on the screen in response to the trigger operation, the adapted application interface comprising a plurality of interface elements, and for an interface element of the plurality of interface elements, a first physical size of the interface element presented in the adapted application interface being the same as a second physical size presented in a reference application interface; and the first physical size of the interface element being determined based on an adapted virtual pixel size of the interface element in the adapted application interface and a dot density to be adapted, and the adapted virtual pixel size being the same as a reference virtual pixel size of the interface element in the reference application interface, wherein the dot density to be adapted is determined as follows:

determining an effective width and effective height of the screen based on the resolution to be adapted of the screen and an original screen density of the screen;

determining a standardization direction of the screen based on a first difference degree between the effective width and a reference width of the reference screen and a second difference degree between the effective height and a reference height of the reference screen; and adjusting an original pixel density of the screen to obtain the dot density to be adapted based on the standardization direction.

17. The computer device according to claim 16, wherein the first physical size of the interface element presented in the adapted application interface is determined as follows:

determining an adapted pixel size of the interface element in the adapted application interface based on the adapted virtual pixel size of the interface element and the dot density to be adapted; and determining the first physical size of the interface element presented in the adapted application interface based on the adapted pixel size of the interface element.

18. A non-transitory computer readable storage medium, with a computer program executable by a computer device stored, which, when executed on the computer device, causes the computer device to execute:

acquiring a trigger operation for an application to be displayed on a screen; and displaying an adapted application interface of the application on the screen in response to the trigger operation, the adapted application interface comprising a plurality of interface elements, and for an interface element of the plurality of interface elements, a first physical size of the interface element presented in the adapted application interface being the same as a second physical size presented in a reference application interface; and the first physical size of the interface element being determined based on an adapted virtual pixel size of the interface element in the adapted application interface and a dot density to be adapted, and the adapted virtual pixel size being the same as a reference virtual pixel size of the interface element in the reference application interface, wherein the dot density to be adapted is determined as follows:

determining an effective width and effective height of the screen based on the resolution to be adapted of the screen and an original screen density of the screen;

determining a standardization direction of the screen based on a first difference degree between the effective width and a reference width of the reference screen and a second difference degree between the effective height and a reference height of the reference screen; and adjusting an original pixel density of the screen to obtain the dot density to be adapted based on the standardization direction.

19. The computer readable storage medium according to claim 18, wherein the dot density to be adapted is determined as follows:

determining an effective width and effective height of the screen based on the resolution to be adapted of the screen and an original screen density of the screen;

determining a standardization direction of the screen based on a first difference degree between the effective width and a reference width of the reference screen and a second difference degree between the effective height and a reference height of the reference screen; and adjusting an original pixel density of the screen to obtain the dot density to be adapted based on the standardization direction.

* * * * *